US009965956B2

(12) United States Patent
Tsushima et al.

(10) Patent No.: US 9,965,956 B2
(45) Date of Patent: May 8, 2018

(54) COLLISION RISK CALCULATION DEVICE, COLLISION RISK DISPLAY DEVICE, AND VEHICLE BODY CONTROL DEVICE

(71) Applicant: Mitsubishi Electric Corporation, Tokyo (JP)

(72) Inventors: Naoyuki Tsushima, Tokyo (JP); Masahiro Abukawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days. days.

(21) Appl. No.: 15/327,548

(22) PCT Filed: Dec. 9, 2014

(86) PCT No.: PCT/JP2014/006135
§ 371 (c)(1),
(2) Date: Jan. 19, 2017

(87) PCT Pub. No.: WO2016/092591
PCT Pub. Date: Jun. 16, 2016

(65) Prior Publication Data
US 2017/0186319 A1    Jun. 29, 2017

(51) Int. Cl.
*G08G 1/16* (2006.01)

(52) U.S. Cl.
CPC ..................... *G08G 1/16* (2013.01)

(58) Field of Classification Search
CPC ..................................................... G08G 1/166
See application file for complete search history.

(56) References Cited

U.S. PATENT DOCUMENTS

| 8,255,144 B2 * | 8/2012 | Breed ................. B60N 2/2863 |
| | | 340/436 |
| 8,731,977 B1 * | 5/2014 | Hardin .................. G06Q 40/08 |
| | | 701/482 |
| 9,139,202 B2 * | 9/2015 | Duncan ............... B60W 30/095 |
| 9,212,926 B2 * | 12/2015 | Attard .................... G01C 21/36 |
| 9,242,654 B2 * | 1/2016 | Do ......................... B60W 50/14 |
| 9,342,986 B2 * | 5/2016 | Dariush ................. G08G 1/166 |
| 9,390,624 B2 * | 7/2016 | Minemura ............. G08G 1/166 |

(Continued)

FOREIGN PATENT DOCUMENTS

| DE | 2012-234407 A | 11/2012 |
| JP | 2004-175204 A | 6/2004 |

(Continued)

*Primary Examiner* — Thomas G Black
*Assistant Examiner* — Ana D Thomas
(74) *Attorney, Agent, or Firm* — Birch, Stewart, Kolasch & Birch, LLP

(57) ABSTRACT

A collision risk calculation device includes: a movement information obtaining unit that obtains a speed and a movement direction of an obstacle; and a risk map generator that generates a risk map indicating a range within which the obstacle can exist after one unit of time and degree of risk of collision of an own vehicle with the obstacle within the range, on a basis of the speed and the movement direction of the obstacle obtained by the movement information obtaining unit, wherein the risk map generator changes the range in left and right directions with respect to a traveling direction of the obstacle, on a basis of the speed of the obstacle in the traveling direction.

8 Claims, 24 Drawing Sheets

(56) References Cited

U.S. PATENT DOCUMENTS

| | | | |
|---|---|---|---|
| 9,415,774 B2* | 8/2016 | Sugano | B62D 15/027 |
| 9,493,118 B1* | 11/2016 | Laur | B60Q 9/008 |
| 9,633,565 B2* | 4/2017 | Conrad | B60W 30/09 |
| 9,682,703 B2* | 6/2017 | Okita | B60T 8/17558 |
| 9,738,278 B2* | 8/2017 | Hasberg | B60W 30/09 |
| 9,804,599 B2* | 10/2017 | Kentley-Klay | G05D 1/0088 |
| 2007/0080825 A1* | 4/2007 | Shiller | B60R 21/013 340/903 |
| 2007/0080968 A1 | 4/2007 | Kogure et al. | |
| 2008/0288140 A1 | 11/2008 | Matsuno | |
| 2009/0024357 A1* | 1/2009 | Aso | B60W 30/10 702/181 |
| 2009/0109049 A1* | 4/2009 | Frederick | F16P 3/14 340/686.6 |
| 2010/0030472 A1* | 2/2010 | Kindo | G08G 1/167 701/300 |
| 2010/0106356 A1* | 4/2010 | Trepagnier | G01S 17/023 701/25 |
| 2011/0106442 A1* | 5/2011 | Desai | G01S 5/0072 701/532 |
| 2011/0128136 A1* | 6/2011 | Katoh | G08G 1/164 340/435 |
| 2011/0133915 A1 | 6/2011 | Ito | |
| 2011/0205042 A1* | 8/2011 | Takemura | G08G 1/166 340/435 |
| 2011/0215947 A1* | 9/2011 | Ekmark | G08G 1/163 340/902 |
| 2011/0238309 A1* | 9/2011 | Tsunekawa | B60R 21/0134 701/301 |
| 2012/0283895 A1* | 11/2012 | Noda | G08G 1/166 701/1 |
| 2012/0330541 A1* | 12/2012 | Sakugawa | B60W 30/0956 701/301 |
| 2013/0238192 A1* | 9/2013 | Breu | G01S 13/726 701/41 |
| 2014/0203925 A1* | 7/2014 | Augst | B60Q 9/007 340/435 |
| 2014/0240114 A1* | 8/2014 | Waeller | B60Q 9/008 340/435 |
| 2015/0015712 A1* | 1/2015 | Sempuku | G08G 1/165 348/148 |
| 2015/0035663 A1* | 2/2015 | Sugano | G08G 1/166 340/436 |
| 2015/0057918 A1* | 2/2015 | Sugano | G01S 7/4816 701/301 |
| 2015/0291158 A1* | 10/2015 | Okita | B60T 8/17558 701/1 |
| 2015/0344030 A1* | 12/2015 | Damerow | B60W 30/0956 701/1 |
| 2016/0260328 A1* | 9/2016 | Mishra | G08G 1/163 |
| 2016/0264134 A1* | 9/2016 | Ohsugi | B60W 30/095 |
| 2016/0275796 A1* | 9/2016 | Kim | G08G 1/163 |
| 2017/0151944 A1* | 6/2017 | Al-Stouhi | B60W 30/0953 |
| 2017/0210359 A1* | 7/2017 | Brandin | B60T 7/22 |

FOREIGN PATENT DOCUMENTS

| | | |
|---|---|---|
| JP | 2006-154967 A | 6/2006 |
| JP | 2007-102639 A | 4/2007 |
| JP | 2011-118753 A | 6/2011 |
| JP | 2011-197781 A | 10/2011 |
| JP | 2011-210102 A | 10/2011 |
| JP | 2011-221667 A | 11/2011 |
| JP | 2011-248445 A | 12/2011 |
| JP | 4980076 B2 | 7/2012 |
| JP | 2012-173786 A | 9/2012 |
| JP | 2012-234410 A | 11/2012 |

* cited by examiner

TIME t+1

TIME t

101

TIME t+1

TIME t

COLLISION RISK CALCULATION DEVICE, COLLISION RISK DISPLAY DEVICE, AND VEHICLE BODY CONTROL DEVICE

TECHNICAL FIELD

The present invention relates to a collision risk calculation device that calculates risk of collision of a vehicle with an obstacle, a collision risk display device that displays the obtained collision risk, and a vehicle body control device that controls the vehicle on the basis of the collision risk.

BACKGROUND ART

Until now, driver assistance techniques have been intended to provide assistance, such as warning deviation from a lane or keeping the speed of a vehicle constant, to drivers. However, in recent years, with increase in awareness of safety, and advancement in performance and price reduction of processors or various sensor devices, driver assistance techniques relating to active safety, such as emergency automatic braking or emergency steering avoidance, for avoiding collision with obstacles have been commercialized, researched, and developed. In driver assistance techniques for avoiding collision with obstacles, it is necessary to properly perceive risk of collision with obstacles. Techniques of setting a risk map indicating such risk depending on the relative speed between an own vehicle and an obstacle have been devised (for example, Patent Literature 1).

The risk map indicates a range within which the obstacle can exist after one unit of time and degree of risk when the own vehicle enters the range. The own vehicle can prevent collision with the obstacle after one unit of time by traveling while trying not to enter the range. The collision risk calculation device described in Patent Literature 1 determines a range of a risk map of a front obstacle depending on the relative speed of an own vehicle relative to the speed of the front obstacle. Thus, the range of the risk map is uniformly increased when the speed of the front obstacle is lower than the speed of the own vehicle, and uniformly decreased when the speed of the front obstacle is higher than the speed of the own vehicle. However, when the range of the risk map is uniformly determined depending on the relative speed, the risk of collision cannot be accurately estimated. For example, when the speed of the front obstacle is lower than the speed of the own vehicle, since it is predicted that the own vehicle is closer to the front obstacle after a predetermined time period, the range of the risk map is set to be large. Thus, the own vehicle largely avoids and overtakes the obstacle or brakes suddenly so as not to enter in a direction of the risk map, which is set to be large. However, actually, when the speed of the front vehicle is significantly high, the front vehicle is less likely to turn right or left without slowing down.

As such, the collision risk calculation device described in Patent Literature 1 uniformly sets the range of the risk map to be large in left and right directions depending on the relative speed of the own vehicle relative to the speed of the front obstacle even when the speed of the front vehicle is significantly high, and thus may cause unnecessary actions, such as an action of largely avoiding an obstacle to the own vehicle or sudden braking.

CITATION LIST

Patent Literature

Patent Literature 1: Japanese Patent No. 4980076

SUMMARY OF INVENTION

Technical Problem

The collision risk calculation device, collision risk display device, and vehicle body control device of the present invention have been made to solve the above problems, and are intended to reflect, in a risk map, the possibility of a right or left turn of an obstacle, which varies depending on the speed of the obstacle.

Solution to Problem

A collision risk calculation device of the present invention includes: a movement information obtaining unit that obtains a speed and a movement direction of an obstacle; and a risk map generator that generates a risk map indicating a range within which the obstacle can exist after one unit of time and degree of risk of collision within the range, on a basis of the speed and the movement direction of the obstacle obtained by the movement information obtaining unit, wherein the risk map generator changes the range in left and right directions with respect to a traveling direction of the obstacle, on a basis of the speed of the obstacle.

A collision risk display device of the present invention includes: a display that displays a risk map indicating a range within which an obstacle can exist after one unit of time and degree of risk of collision within the range; and a map display controller that obtains the risk map and controls the display to display the obtained risk map, the range of the risk map being changed in left and right directions with respect to a traveling direction of the obstacle on a basis of a speed of the obstacle.

A vehicle body control device of the present invention includes:

a vehicle body actuator that controls motion of an own vehicle on a basis of a risk map indicating a range within which an obstacle can exist after one unit of time and degree of risk of collision within the range; and a vehicle body controller that obtains the risk map and controls the vehicle body actuator on a basis of the obtained risk map, the range of the risk map being changed in left and right directions with respect to a traveling direction of the obstacle on a basis of a speed of the obstacle.

Advantageous Effects of Invention

The collision risk calculation device, collision risk display device, and vehicle body control device of the present invention change a range of a risk map in left and right directions with respect to a traveling direction of an obstacle on the basis of the speed of the obstacle, and thus can reflect, in the risk map, the possibility of a right or left turn of the obstacle, which varies depending on the speed of the obstacle.

DESCRIPTION OF EMBODIMENTS

First Embodiment

Figure 1:
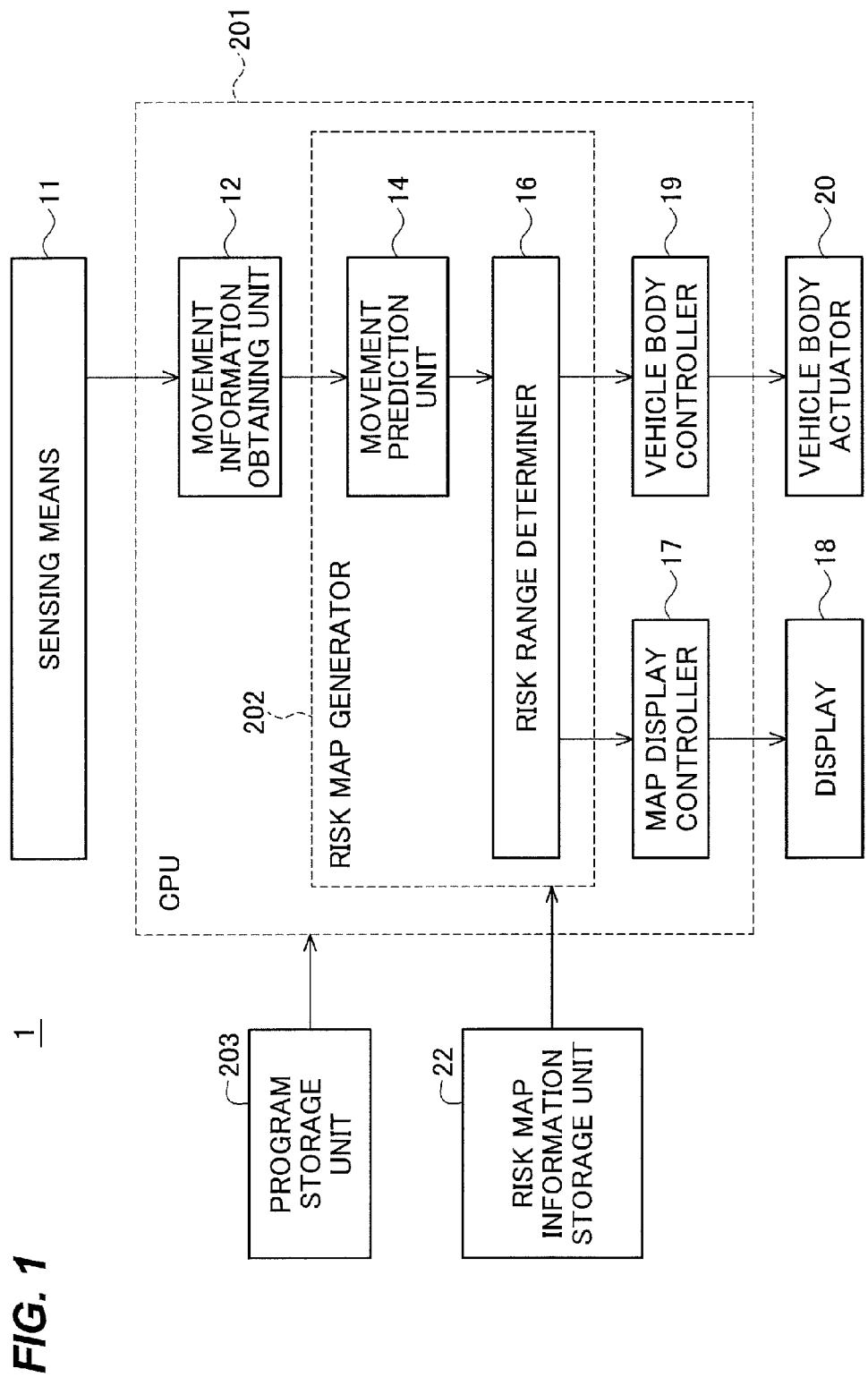
FIG. 1 is a configuration diagram of a vehicle body control device according to a first embodiment.

A vehicle body control device 1 according to a first embodiment will be described below with reference to FIG. 1. FIG. 1 is a configuration diagram of the vehicle body control device 1 according to the first embodiment.

The vehicle body control device 1 detects an obstacle, generates a risk map of the obstacle, and controls a traveling direction of an own vehicle on the basis of the risk map. The vehicle body control device 1 includes a sensing means (or sensor) 11, a central processing unit (CPU) 201, a program storage unit 203, a risk map information storage unit 22, a display (or display unit) 18, and a vehicle body actuator 20. The CPU 201 includes a movement information obtaining unit 12, a risk map generator 202, a map display controller 17, and a vehicle body controller 19. The risk map generator 202 includes a movement prediction unit 14 and a risk range determiner 16. In the following description, a device including the movement information obtaining unit 12 and risk map generator 202 will be referred to as a collision risk calculation device 2; a device including the movement information obtaining unit 12, risk map generator 202, map display controller 17, and display 18 will be referred to as a collision risk display device 3.

The sensing means 11 is a means for obtaining information (referred to below as sensor information) regarding an obstacle. For example, the sensing means 11 includes a sensor device, such as a laser radar or a camera, provided on the vehicle, and a signal processor that processes data obtained by the sensor device to calculate the distance between the own vehicle and an obstacle, or the like. The sensing means 11 performs sensing around the own vehicle at predetermined time intervals and obtains the distance between the own vehicle and an obstacle, image information of an obstacle, or the like. The predetermined time intervals are previously set by a designer so that the position and movement direction of an obstacle can be predicted by the movement information obtaining unit 12 and movement prediction unit 14 described later.

The movement information obtaining unit 12 calculates the position of an obstacle on the basis of sensor information obtained at different times, and calculates and obtains information regarding the speed and movement direction of the obstacle on the basis of the position information. The position of the obstacle is information, such as positional coordinates, indicating the position of the obstacle. Although the position, speed, and movement direction of the obstacle can be calculated in various ways, the position information, speed, and movement direction of the obstacle are calculated on the basis of sensor information obtained by the sensing means 11 at times t−1 and t, for example. The movement information obtaining unit 12 calculates the position information, speed, and movement direction of the obstacle at the time t from the distance to the obstacle at the time t−1, the distance to the obstacle at the time t, and the positions of the own vehicle at the times t−1 and t. In the above description, the movement information obtaining unit 12 calculates and obtains the information regarding the speed and movement direction of the obstacle, but it may directly obtain the information regarding the speed and movement direction of the obstacle from the outside. In the following description, a case where the movement information obtaining unit 12 calculates and obtains the information regarding the speed and movement direction of the obstacle will be described as an example.

The risk map generator 202 generates a risk map on the basis of the speed and movement direction of the obstacle calculated by the movement information obtaining unit 12. The risk map will be described later.

The movement prediction unit 14 calculates a movement prediction vector of the obstacle on the basis of the speed and movement direction calculated by the movement information obtaining unit 12. The movement prediction unit 14 also calculates movement prediction vectors in left and right directions with respect to the traveling direction of the obstacle, on the basis of the speed of the obstacle. At this time, the movement prediction vectors in the left and right directions of the obstacle are adjusted depending on the speed of the obstacle. Specifically, the movement prediction vectors in the left and right directions with respect to the traveling direction are set to be smaller as the speed of the obstacle is higher. Also, the movement prediction vectors in the left and right directions with respect to the traveling direction are set to be greater as the speed of the obstacle is lower. In the calculation of the movement prediction vectors in the left and right directions, the lengths of the movement prediction vectors may be adjusted according to the speed; or a threshold or the like for the speed may be provided, and the lengths of the movement prediction vectors may be made short when the speed of the obstacle exceeds the threshold and made long when the speed of the obstacle is equal to or less than the threshold. For example, when the speed of the obstacle is higher than a predetermined threshold, the movement prediction vectors in the left and right directions are decreased by 50%; when it is lower than the threshold, the movement prediction vectors are set to have about the same length as that in the traveling direction of the obstacle. The movement prediction unit 14 also calculates obliquely leftward and rightward movement prediction vectors extending in the traveling direction by combining the movement prediction vector in the traveling direction and the movement prediction vectors in the left and right directions. The way of calculating the movement prediction vectors will be described in detail later.

Figure 2:
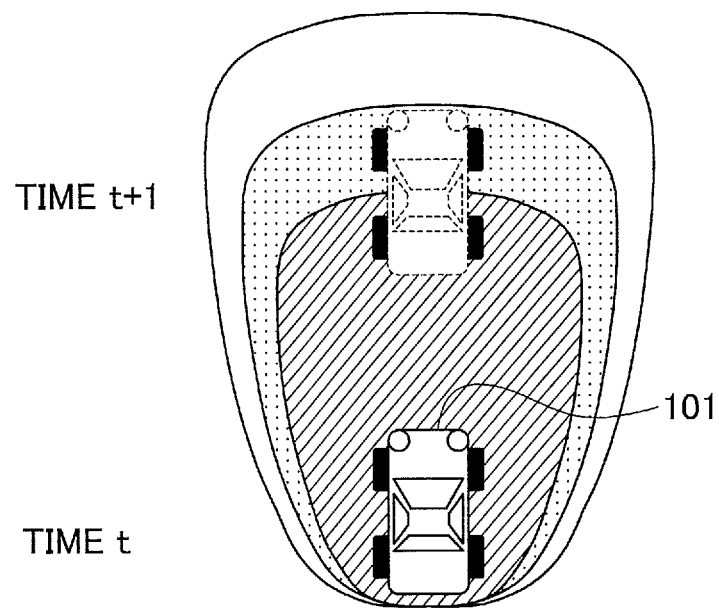
FIG. 2 is a diagram for explaining a risk map according to the first embodiment.

The risk range determiner 16 generates a risk map on the basis of the movement prediction vectors obtained from the movement prediction unit 14. The risk map indicates a range within which the obstacle can exist at a time t+1 one unit of time after the current time t and degree of risk when the own vehicle enters the range. The risk map will be described below in detail with reference to FIG. 2. FIG. 2 is a diagram for explaining the risk map according to the first embodiment. In FIG. 2, 101 indicates an obstacle. The risk map is three-dimensional data, has a range in a plane parallel to the ground, and has a height in a direction of a normal vector to the ground. The range of the risk map indicates a range within which the obstacle can exist after one unit of time, and the height indicates degree of risk when the own vehicle enters the range of the risk map. In the example of FIG. 2, for convenience of explanation, the risk map is two-dimensionally illustrated like contour lines of mountains, the range of the risk map is indicated by a solid line, and the height of the risk map is represented by shades of color. For the height of the risk map, the color is darker as the degree of risk is higher, and the color is lighter as the degree of risk is lower.

Figure 3:
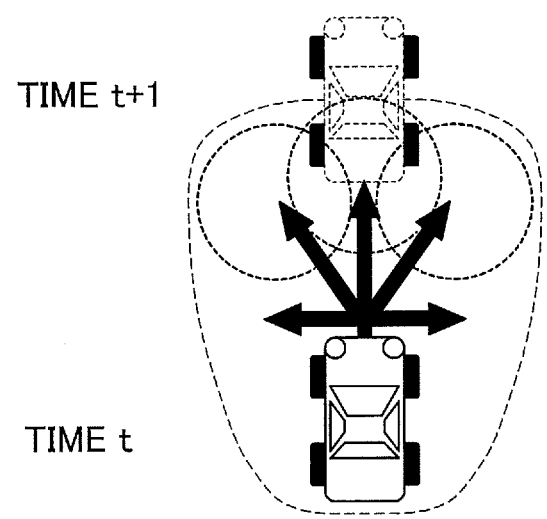
FIG. 3 is an example illustrating a relationship between movement prediction vectors and the risk map.

Next, a way in which the risk range determiner 16 generates the risk map on the basis of the movement prediction vectors calculated by the movement prediction unit 14 will be described. FIG. 3 is an example illustrating a relationship between the movement prediction vectors and the risk map. The risk range determiner 16 sets predetermined areas (circles indicated by dotted lines in FIG. 3) with the tips of the movement prediction vector in the traveling direction and the resultant vectors as their centers, and determines a range of the risk map having the highest degree of risk so that the range includes all the thus set areas. The risk range determiner 16 also determines ranges of the risk map having lighter colors in order by increasing the range of the risk map having the highest degree of risk at arbitrary magnifications. The way of determining the ranges of the risk map is not limited to this, and it is possible to first determine a range of the risk map having the lowest degree of risk and determine ranges of the risk map having higher degrees of risk in order by decreasing the range of the risk map having the lowest degree of risk at arbitrary magnifications. It is also possible to previously store, for each degree of risk, areas (circles indicated by dotted lines in FIG. 3) set with the tips of the movement prediction vectors as their centers, and individually determine the range of the risk map corresponding to each degree of risk on the basis of the previously stored areas.

The map display controller 17 is a means for controlling the display 18 described later to display the generated risk map.

The display 18 is a means for displaying the risk map. It is, for example, a head-up display, a monitor of a car navigation system, or the like.

The vehicle body controller 19 is a means for controlling the vehicle body actuator 20 described later on the basis of the generated risk map. For example, when the vehicle body controller 19 determines that the current speed and traveling direction of the own vehicle will cause collision with the obstacle, it controls the vehicle body actuator 20.

The vehicle body actuator 20 is a means for controlling the vehicle body on the basis of the risk map. It is, for example, an actuator for controlling a brake, an actuator for performing a steering control for avoiding danger, or the like.

The program storage unit 203 stores a program for controlling the CPU 201, and is, for example, a read only memory (ROM). The CPU 201 performs, in accordance with the program stored in the program storage unit 203, operations of the movement information obtaining unit 12, movement prediction unit 14, risk range determiner 16, map display controller 17, and vehicle body controller 19.

The risk map information storage unit 22 stores information regarding a risk map used by the vehicle body controller 19, and a ROM is used, for example. The information includes, for example, magnification of the movement prediction vectors in the left and right directions corresponding to the speed of the obstacle, the degree of risk of the risk map, image data of the risk map, or the like.

Figure 4:
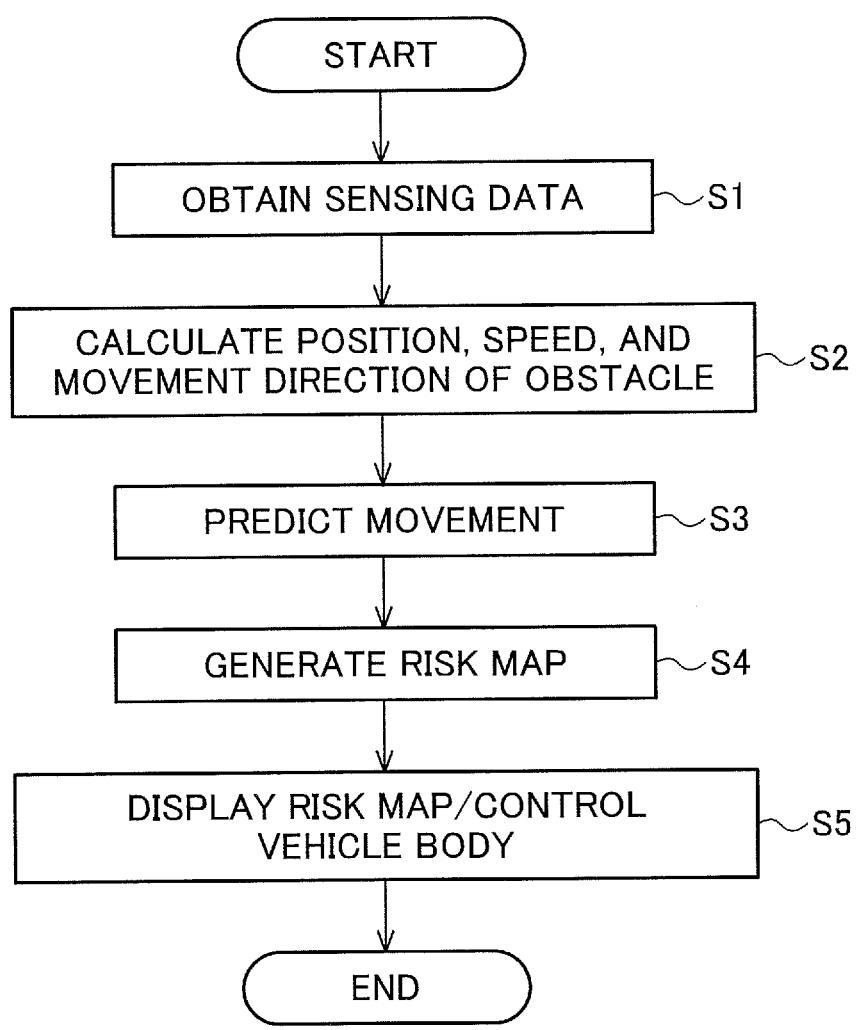
FIG. 4 is an operational flowchart of the vehicle body control device according to the first embodiment.

Next, an operation of the vehicle body control device according to the first embodiment will be described with reference to FIG. 4. FIG. 4 is an operational flowchart of the vehicle body control device according to the first embodiment.

In S1, the sensing means 11 obtains sensor information on obstacles. In this example, it is assumed that sensor information is obtained at times t−1 and t.

In S2, the movement information obtaining unit 12 obtains the sensor information at the times t−1 and t from the sensing means 11, and calculates the positions of the obstacles at the times t−1 and t. The movement information obtaining unit 12 further calculates, from information on the positions of the obstacles, the speeds and movement directions of the obstacles at the time t.

Figure 5:
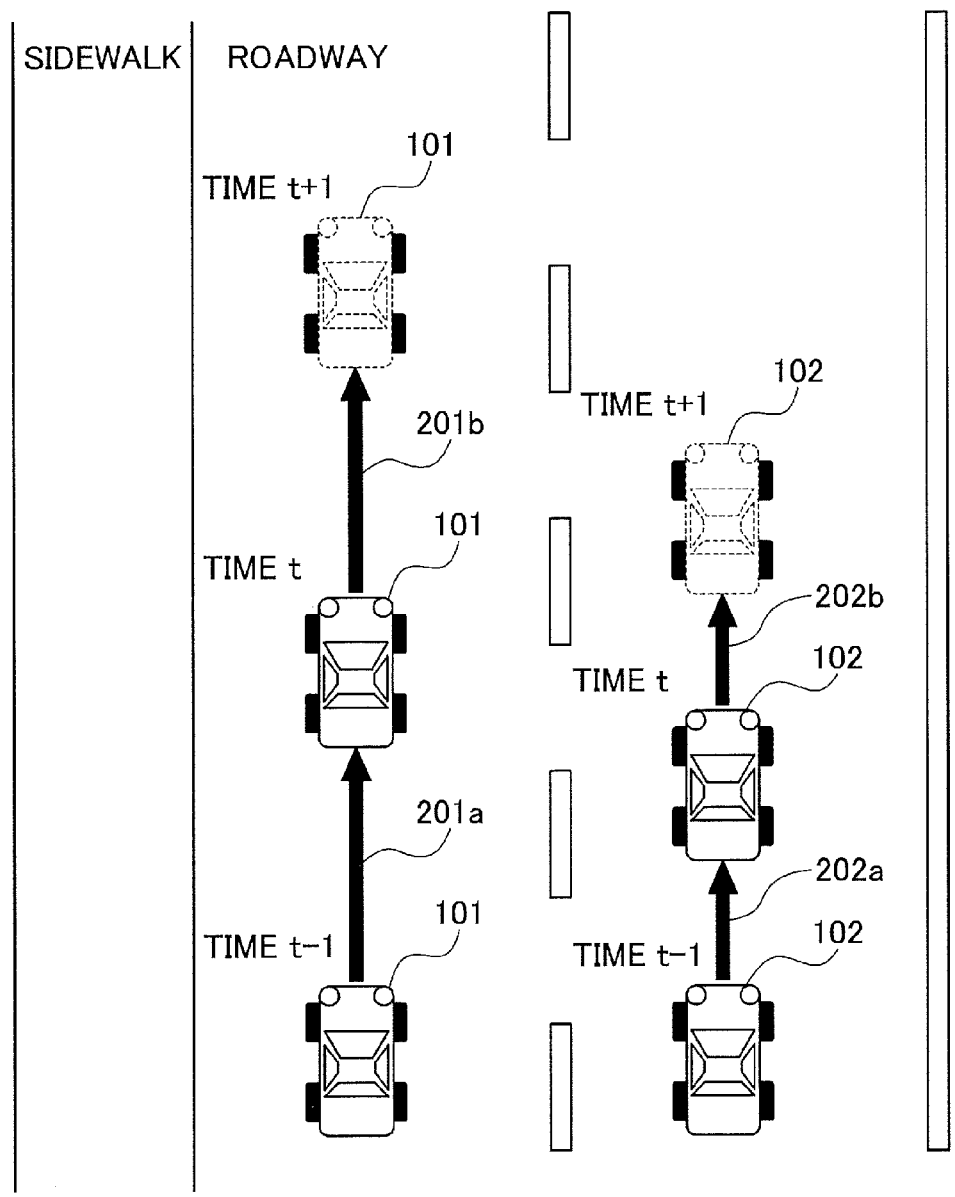
FIG. 5 illustrates an example in which two vehicles are traveling at different speeds on different lanes.

In S3, the movement prediction unit 14 calculates the movement prediction vectors of the obstacles on the basis of the speeds and movement directions calculated by the movement information obtaining unit 12. Here, a way of calculating the movement prediction vectors will be described in detail with reference to FIG. 5. FIG. 5 illustrates an example in which two vehicles are traveling at different speeds on different lanes. In FIG. 5, the vehicles 101 and 102 are obstacles. The movement vectors 201a and 202a are movement vectors from the time t−1 one unit of time before the current time t to the current time t. The directions in which the arrows of the movement vectors 201a and 202a point indicate the movement directions, and the lengths of the movement vectors 201a and 202a indicate the speeds. From these information, the movement prediction unit 14 predicts the positions of the obstacles at the time t+1 one unit of time after the current time t. Although the prediction can be made in various ways, a linear prediction will be described as an example. In a short unit of time, it can be assumed that the vehicles shift linearly with respect to their previous movements, so the movement prediction vectors 201b and 202b from the current time t to the time t+1 can be assumed to be vectors that extend from the vehicles 101 and 102 at the time t and have the same lengths and directions as those of the movement vectors 201a and 202a, respectively. It is possible to predict that the vehicles 101 and 102 at the time t+1 after one unit of time will be traveling at the tips of the movement prediction vectors 201b and 202b. In the calculation of the movement prediction vectors, the linear prediction is used here, but a Kalman filter or the like may be used.

Figure 6:
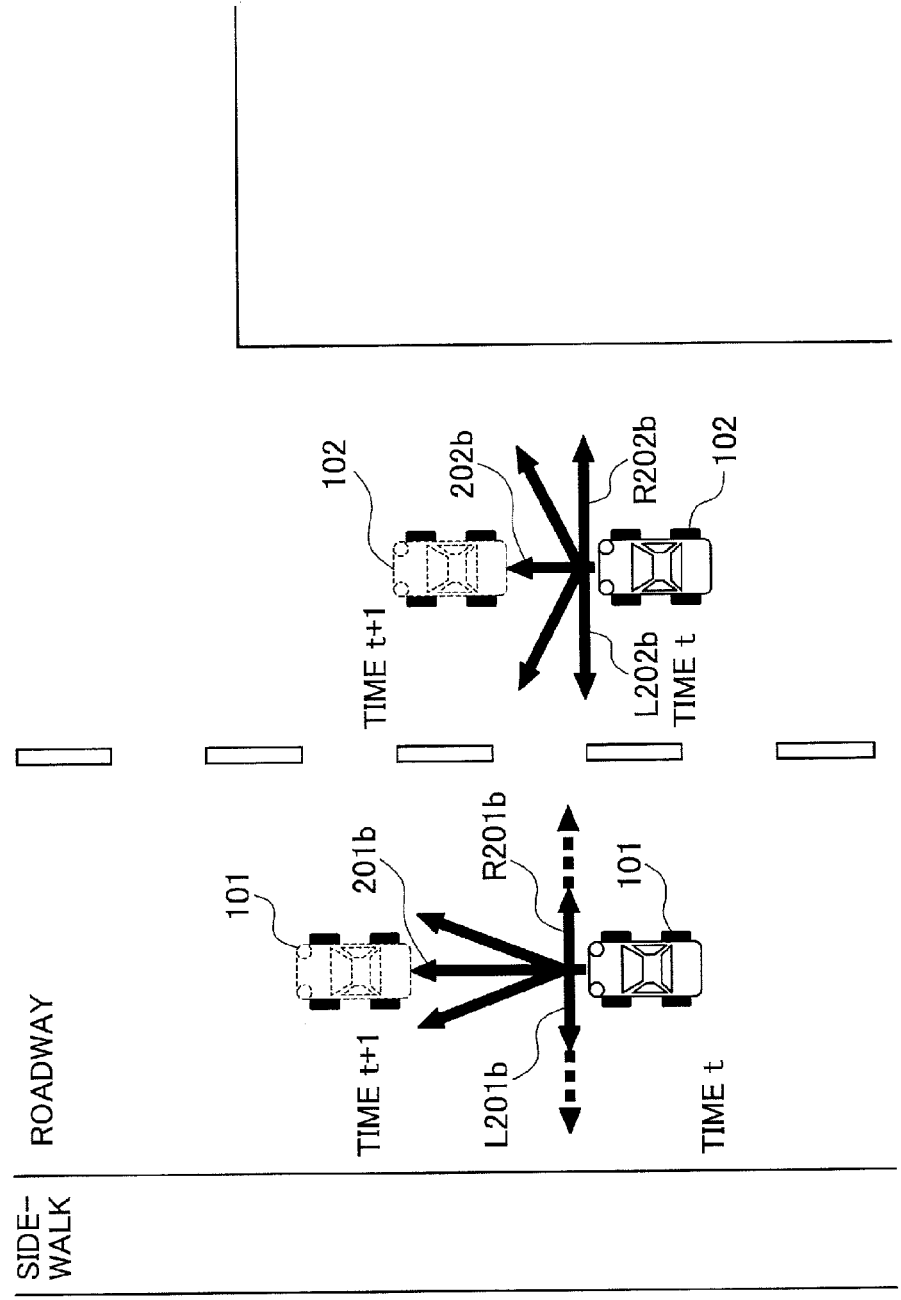
FIG. 6 illustrates an example of calculation of movement prediction vectors when the two vehicles are traveling at the different speeds on the different lanes.

The movement prediction unit 14 also calculates movement prediction vectors in the left and right directions on the basis of the movement prediction vectors in the traveling directions. At this time, the lengths of the movement prediction vectors in the left and right directions of the obstacles are adjusted depending on the speeds of the obstacles at the time t calculated by the movement information obtaining unit 12. That is, they are adjusted depending on the lengths of the movement vectors from the time t−1 to the time t. The movement prediction unit 14 adjusts the lengths of the movement prediction vectors on the basis of preset data that is stored in the risk map information storage unit 22 and in which the speed of an obstacle and an adjustment ratio for the movement prediction vectors are associated with each other. FIG. 6 illustrates an example of calculation of the movement prediction vectors when the two vehicles are traveling at the different speeds on the different lanes. For the vehicle 101, when the speed indicated by the calculated movement prediction vector 201b is higher than a predetermined threshold, the movement prediction unit 14 sets the movement prediction vectors in the left and right directions to be shorter than the movement prediction vector in the traveling direction. For example, the movement prediction vectors L201b and R201b in the left and right directions are set to vectors having a length that is one half of the length of the movement prediction vector 201b in the traveling direction. The movement prediction unit 14 also calculates a resultant vector of the movement prediction vector L201b in the left and right directions and the movement prediction vector 201b in the traveling direction. Likewise, it also calculates a resultant vector of the movement prediction vector R201b and the movement prediction vector 201b. The threshold, magnification ratio for movement prediction vectors, or other values may be arbitrarily determined by a designer.

On the other hand, as in the case of the vehicle 102, when the speed indicated by the calculated movement prediction vector 202b is lower than the predetermined threshold, the movement prediction unit 14 determines, as the movement prediction vectors in the left and right directions, vectors having a length that is twice the length of the movement prediction vector in the traveling direction of the vehicle 102. As in the case of the vehicle 101, resultant vectors are calculated on the basis of the movement prediction vectors in the left and right directions. In this example, when the speed of an obstacle is higher than the predetermined threshold, the movement prediction vectors in the left and right directions are made short. However, this is not mandatory, and it is possible to make the movement prediction vectors in the left and right directions shorter as the speed of a vehicle is higher and make the movement prediction vectors in the left and right directions longer as the speed of the vehicle is lower.

In this manner, the movement prediction unit 14 sets the movement prediction vectors in the left and right directions so that they are shorter as the speed of an obstacle is higher and they are longer as the speed of the obstacle is lower. This makes it possible to set a range of the risk map in which the possibility of a right or left turn is reflected.

Figure 7:
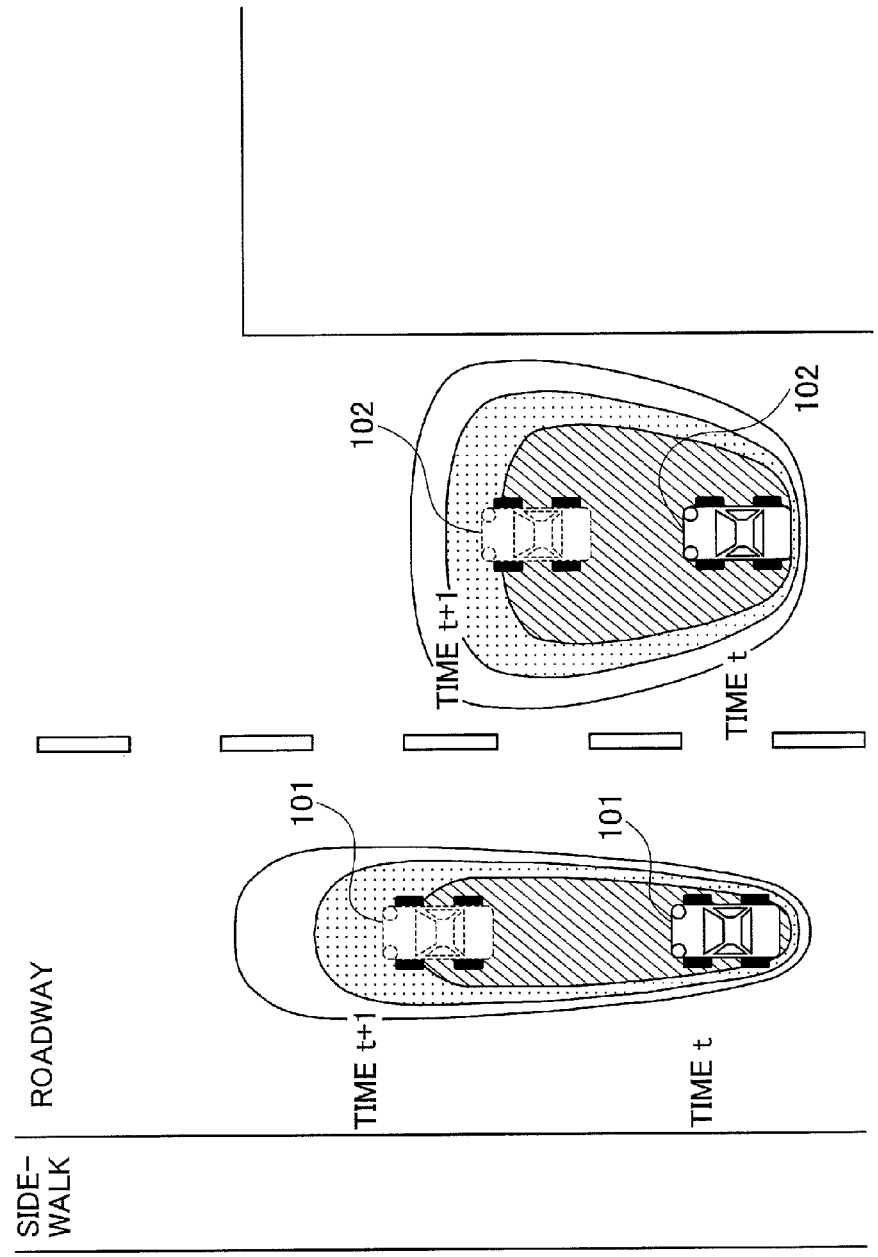
FIG. 7 is an example of risk maps when the two vehicles are traveling at the different speeds on the different lanes.

In S4, the risk range determiner 16 generates risk maps on the basis of the movement prediction vectors calculated by the movement prediction unit 14. In generating the risk maps, for example, ranges of risk are determined by the method described with FIG. 3. However, other methods may be used as long as the lengths of the movement prediction vectors are reflected in the ranges of the risk maps. The risk maps generated as above have ranges as illustrated in FIG. 7. FIG. 7 is an example of the risk maps when the two vehicles are traveling at the different speeds on the different lanes. In FIG. 7, the risk map of the vehicle 101 having the higher speed is vertically longer than the risk map of the vehicle 102 having the lower speed. This indicates that the vehicle 101 having the higher speed has a low possibility of turning right or left and the vehicle 102 having the lower speed has a high possibility of turning right or left.

In S3, the movement prediction unit 14 adjusts, on the basis of the preset data stored in the risk map information storage unit 22, the lengths of the movement prediction vector in the left and right directions with respect to the traveling directions of the obstacles depending on the speeds of the obstacles, thereby adjusting the ranges of the risk maps in the left and right directions. In the vehicle body control device 1 of the present invention, the adjustment of the ranges of the risk maps in the left and right directions is not limited to that performed by the movement prediction unit 14. For example, instead of adjusting the lengths of the movement prediction vectors in the left and right directions with respect to the traveling directions of the obstacles by the movement prediction unit 14 in S3, the risk range determiner 16 adjusts the ranges of the risk maps in the left and right directions in S4. In this case, the risk map information storage unit 22 previously stores preset data in which the speed and an adjustment ratio, such as an enlargement ratio or reduction ratio, for the risk map in the left and right directions are associated with each other. On the basis of this preset data, the risk range determiner 16 adjusts the ranges of the generated risk maps in the left and right directions depending on the speeds of the obstacles. The same applies to the subsequent embodiments.

Figure 8:
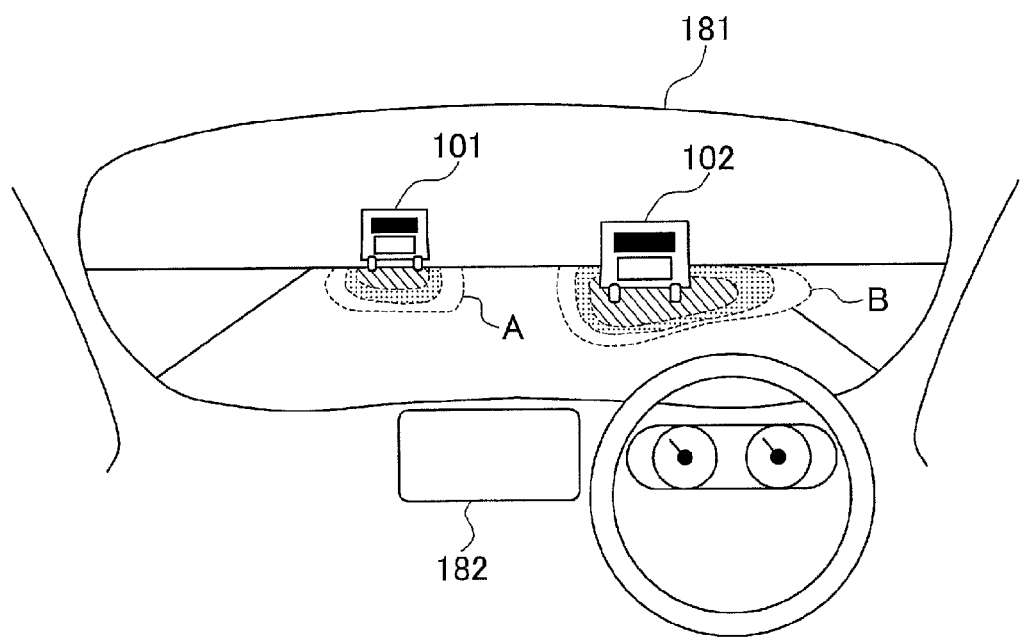
FIG. 8 is an example of display of risk maps displayed by a display according to the first embodiment.

In S5, the map display controller 17 uses information on the risk maps generated by the risk range determiner 16 to cause the display 18 to display the risk maps. FIG. 8 is an example of the risk maps displayed by the display 18 according to the first embodiment. For example, in a case where the display 18 is a head-up display 181, risk maps A and B of the vehicles 101 and 102 are displayed on a windshield of the vehicle in such a manner as to be superimposed on the actual vehicles. The risk maps A and B are images projected onto the head-up display 181, and indicate collision risk with the vehicles 101 and 102, which are obstacles. The vehicles 101 and 102, which are obstacles traveling ahead of the own vehicle, are actual objects that can be seen through the windshield. In this embodiment, the display 18 is the head-up display 181, but is not limited to this and may be a display monitor 182 of a car navigation system. For example, it is possible to display the risk maps A and B on the head-up display 181 in such a manner as to be superimposed on the vehicles 101 and 102, and display an overhead view of the vehicles 101 and 102 (e.g., the risk maps as illustrated in FIG. 7) on the display monitor 182.

Figure 9:
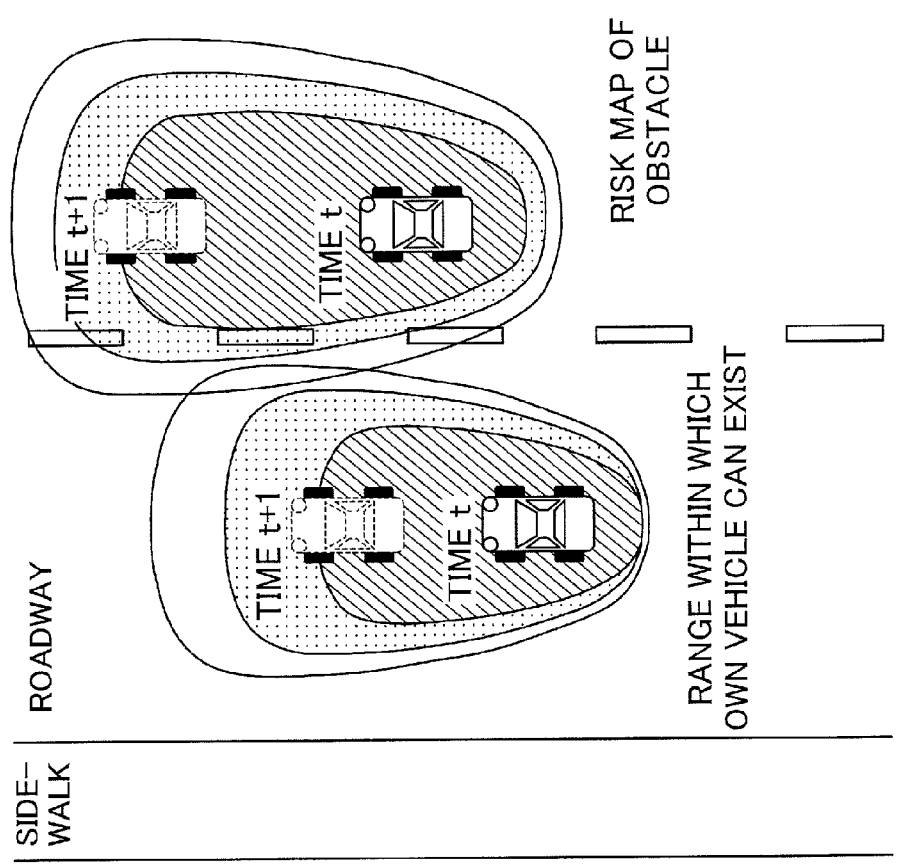
FIG. 9 is for explaining a vehicle body control by a vehicle body controller according to the first embodiment.

The vehicle body control device 1 according to this embodiment can not only calculate and display a risk map but also use the risk map to control the traveling direction, brake, or the like of the own vehicle. The vehicle body controller 19 obtains information on the risk map from the risk range determiner 16 and controls the vehicle body actuator 20. As an example of the vehicle body control method, there is a control using a range within which the own vehicle can exist at the time t+1. Similarly to the method of generating a risk map of an obstacle, the risk range determiner 16 calculates, from the speed and traveling direction of the own vehicle, a range within which the own vehicle can exist at the time t+1 one unit of time after the current time t. If there is an area in which the risk map of the own vehicle and the risk map of an obstacle at the time t+1 overlap each other, the vehicle body controller 19 controls the vehicle body actuator 20, which performs vehicle body braking, steering control, or the like, to avoid danger. FIG. 9 is a diagram for explaining control of the vehicle body by the vehicle body controller 19 according to the first embodiment. FIG. 9 illustrates the risk map of the own vehicle and the risk map of an obstacle at the time t+1. The risk map of the own vehicle and the risk map of the obstacle partially overlap each other. Thus, the vehicle body controller 19 controls the vehicle body actuator 20 to perform vehicle body control, such as avoiding to the left, braking to slow down, or the like.

As above, the vehicle body control device according to the first embodiment makes the movement prediction vectors in the left and right directions smaller as the speed of an obstacle is higher and makes the movement prediction vectors in the left and right directions greater as the speed of the obstacle is lower, which makes it possible to generate a risk map in which the possibility of a right or left turn of the obstacle is more reflected. This makes it possible to reduce unnecessary actions, such as an action of largely avoiding an obstacle to the own vehicle or sudden braking.

In the first embodiment, the collision risk display device 3 includes the movement information obtaining unit 12, risk map generator 202, map display controller 17, and display 18. However, the collision risk display device 3 may be any device that displays a risk map whose range in the left and right directions with respect to the traveling direction of an obstacle is changed on the basis of the speed of the obstacle, and it is sufficient that the collision risk display device 3 includes at least the map display controller 17 and display 18. In this case, the map display controller 17 is configured to, for example, externally obtain a risk map whose range in the left and right directions with respect to the traveling direction of an obstacle is changed on the basis of the speed of the obstacle.

In the above description, the vehicle body control device 1 detects an obstacle, generates a risk map of the obstacle, and controls the traveling direction of the own vehicle on the basis of the risk map. However, for example, the vehicle body controller 19 may be configured to externally obtain a risk map whose range in the left and right directions with respect to the traveling direction of an obstacle is changed on the basis of the speed of the obstacle, and the vehicle body control device 1 controls the traveling direction of the own vehicle.

Second Embodiment

A vehicle body control device of a second embodiment will be described below. The vehicle body control device according to the second embodiment is characterized in that it takes into account the possibility of a right or left turn of an obstacle, and changes the degree of risk of the risk map depending on the type of the obstacle.

Figure 10:
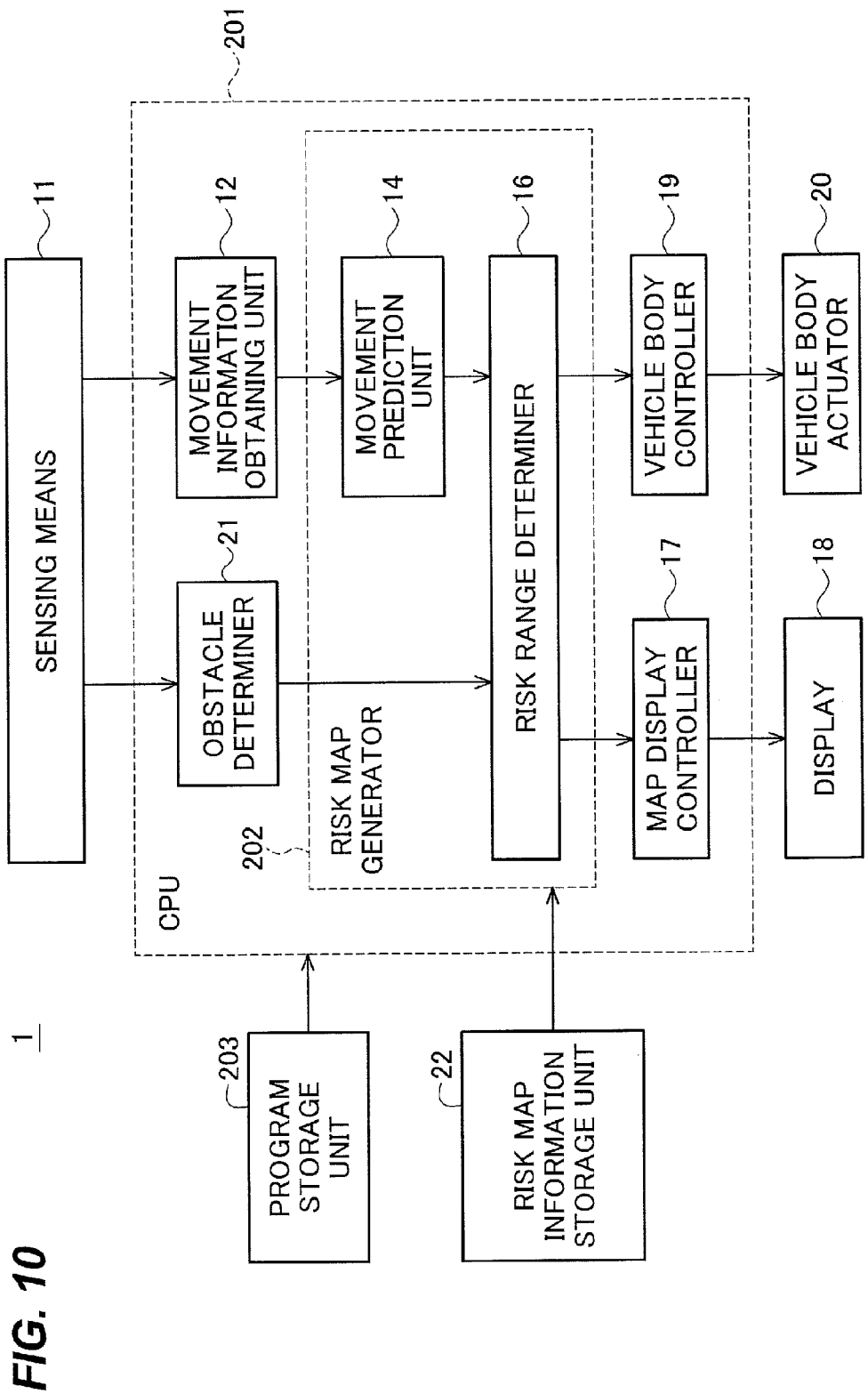
FIG. 10 is a configuration diagram of a vehicle body control device according to a second embodiment.

A configuration of the vehicle body control device according to the second embodiment will be described below with reference to FIG. 10. FIG. 10 is a configuration diagram of the vehicle body control device according to the second embodiment. In this embodiment, the sensing means 11 includes a means, such as a camera, capable of imaging an obstacle. In the description of FIG. 10, elements that are the same as those illustrated in FIG. 1 will be given the same reference numerals and descriptions thereof will be omitted.

The vehicle body control device 1 according to the second embodiment includes an obstacle determiner 21 that determines the type of an obstacle. The risk map information storage unit 22 stores data indicating a correspondence between types of obstacles and degrees of risk.

The obstacle determiner 21 obtains image data of an obstacle from the sensing means 11, such as a camera. The obstacle determiner 21 also determines the type of the obstacle by pattern matching that compares the obtained image data with patterns of obstacles stored in advance. The obstacle determiner 21 outputs information on the determined type of the obstacle to the risk range determiner 16. The type of the obstacle may be, for example, an automobile, a motorcycle, a bicycle, a person, or the like.

The risk map information storage unit 22 stores data indicating a predetermined correspondence between types of obstacles and degrees of risk. For example, when the degrees of risk are each represented by a value within a range of 0 to 100, the risk map information storage unit 22 stores, as preset data, data indicating 100 for a person, 80 for a motorcycle, 50 for an automobile, and the like, and reflects it in the degree of risk in the risk map in accordance with the values. In the above description, the risk map information storage unit 22 stores data in which the degree of risk in colliding with a person is set to be great, but this is not mandatory. For example, when the degrees of risk are set from a viewpoint of risk to the own vehicle, the degree of risk in colliding with a vehicle is set to be great; when the degrees of risk are set from a viewpoint of risk to an obstacle in colliding with the obstacle, the degree of risk for a person is set to a great value.

Figure 11:
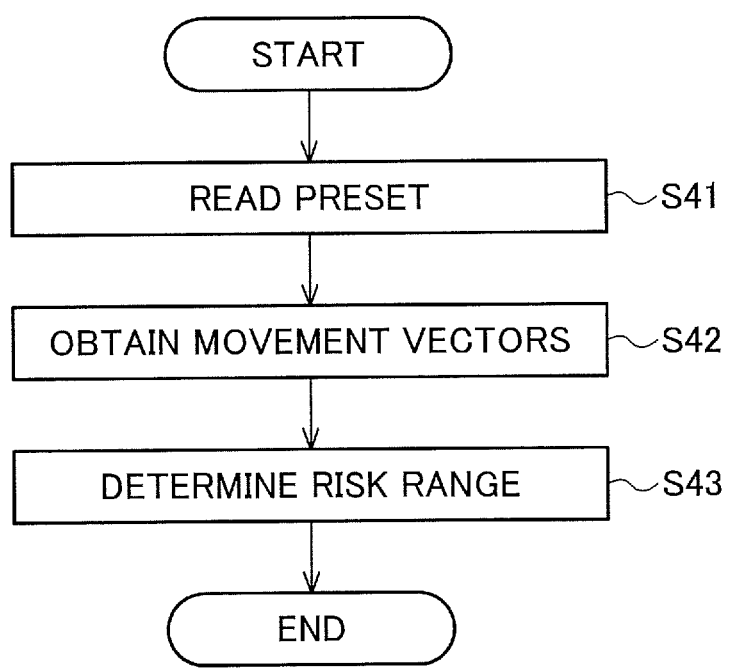
FIG. 11 is an operational flowchart of a risk map generator according to the second embodiment.

FIG. 11 is an operational flowchart of the risk range determiner 16 according to the second embodiment. The risk range determiner 16 reads, from the risk map information storage unit 22, information on the degree of risk corresponding to information on the type of an obstacle obtained from the obstacle determiner 21 (S41). The risk range determiner 16 then obtains information on the movement prediction vectors from the movement prediction unit 14 (S42). From the information read from the risk map information storage unit 22 and the movement prediction vectors, the risk range determiner 16 generates a risk map while adjusting the degree of risk (S43). The risk range determiner 16 can change the range of risk by adjusting the degree of risk as in the above example. In the above description, the risk map information storage unit 22 stores types of obstacles and degrees of risk in association with each other, but it may be configured to store types of obstacles and adjustment ratios for the range of a risk map.

As above, the vehicle body control device according to the second embodiment, adjusts the degree of risk of the risk map depending on the type of an obstacle, which makes it possible to calculate a risk map corresponding to the type of an obstacle. This makes it possible to further reduce unnecessary actions, such as an action of largely avoiding an obstacle to the own vehicle or sudden braking.

Third Embodiment

A vehicle body control device of a third embodiment will be described below. The vehicle body control device according to the third embodiment is characterized in that it takes into account the possibility of a right or left turn of an obstacle, and changes the range of a risk map depending on a condition of a road surface.

Figure 12:
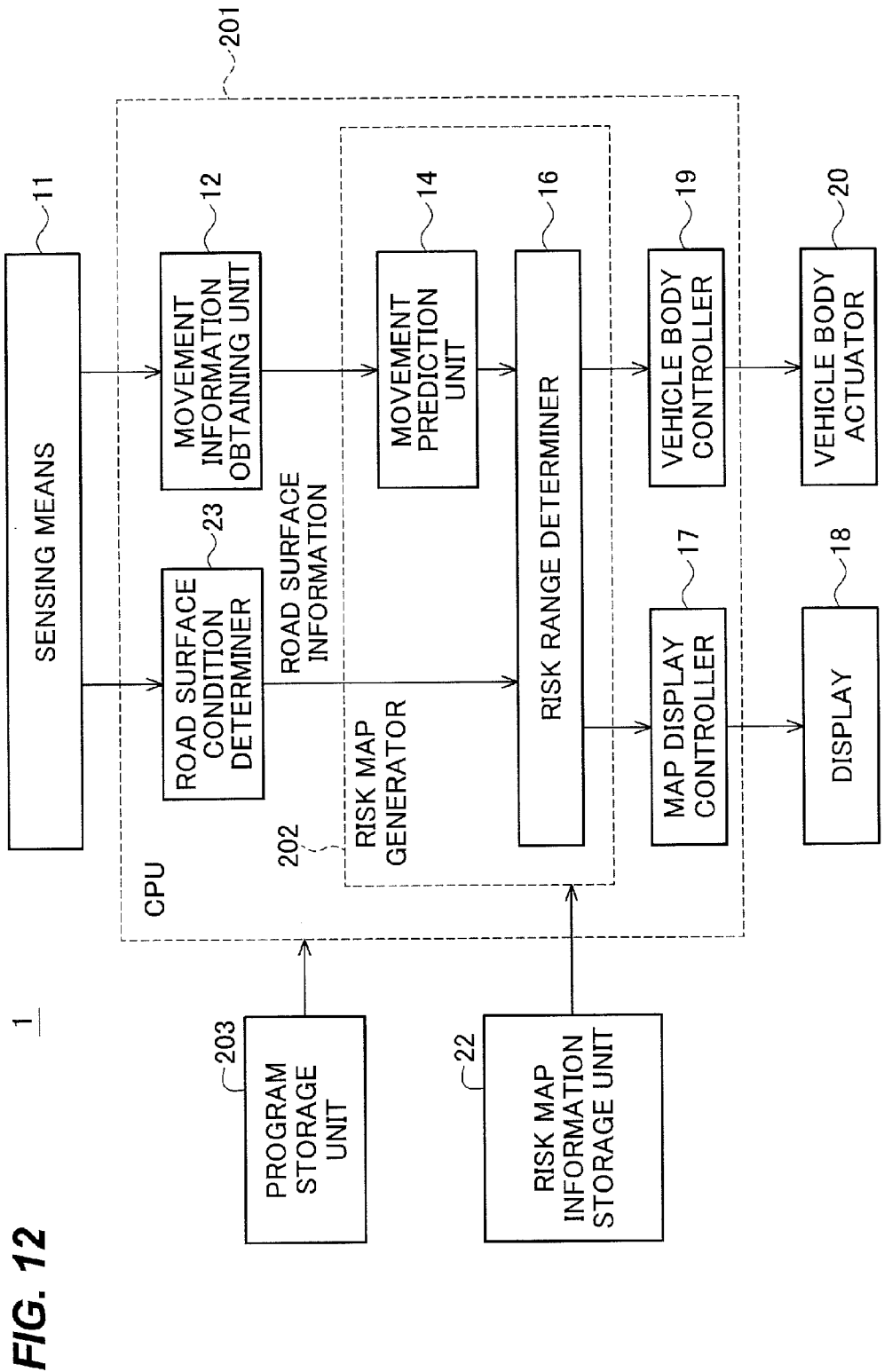
FIG. 12 is a configuration diagram of a vehicle body control device according to a third embodiment.

A configuration of the vehicle body control device according to the third embodiment will be described below with reference to FIG. 12. FIG. 12 is a configuration diagram of the vehicle body control device according to the third embodiment. In this embodiment, the sensing means 11 includes a means for sensing information regarding a road surface condition. In the description of FIG. 12, elements that are the same as those illustrated in FIGS. 1 and 10 will be given the same reference numerals and descriptions thereof will be omitted.

The vehicle body control device according to the third embodiment includes a road surface condition determiner 23 that determines a road surface condition. The risk range determiner 16 according to the third embodiment is characterized in that it generates a risk map depending on the road surface condition.

The road surface condition determiner 23 obtains image data regarding the road surface condition from the sensing means 11, such as a camera. The road surface condition determiner 23 also determines the road surface condition on the basis of the obtained image data. The road surface condition determiner 23 outputs information on the determined road surface condition to the risk range determiner 16. The road surface condition may be, for example, dry, wet, frozen, or snowy. In the description of this embodiment, the sensing means 11 is described by taking the camera as an example, but is not limited to this, and may be other means capable of perceiving a road surface condition. For example, the sensing means 11 may be a sensor for sensing a coefficient of friction of a road surface.

The risk range determiner 16 generates a risk map on the basis of a predetermined correspondence between road surface conditions and degrees of risk. For example, when the road surface condition is "frozen", since a vehicle is likely to slip, taking into account slip or the like, the risk range determiner 16 sets degree of risk of a risk map to be high and generates a risk map with an increased range of risk. The method of generating a risk map in which the road surface condition is reflected is not limited to this; for example, the risk map information storage unit 22 may be configured to store a degree of risk for each road surface condition. For example, when the degrees of risk are each represented by a value within a range of 0 to 100, data indicating 100 for a frozen condition, 80 for a snowy condition, 50 for a wet condition, 20 for a dry condition, and the like, is held as preset data, and it is reflected in degree of risk in a risk map in accordance with the values.

Figure 13:
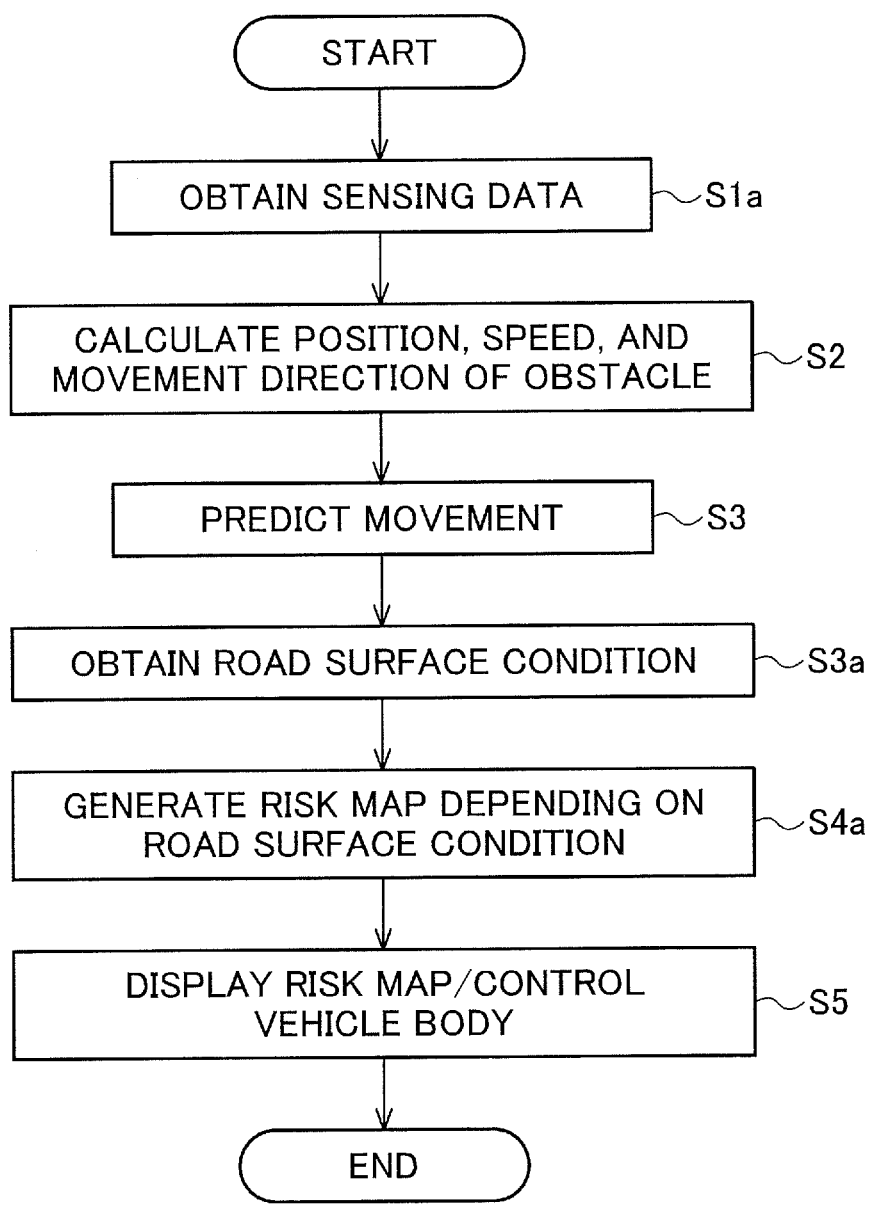
FIG. 13 is an operational flowchart of a risk map generator according to the third embodiment.
Figure 14:
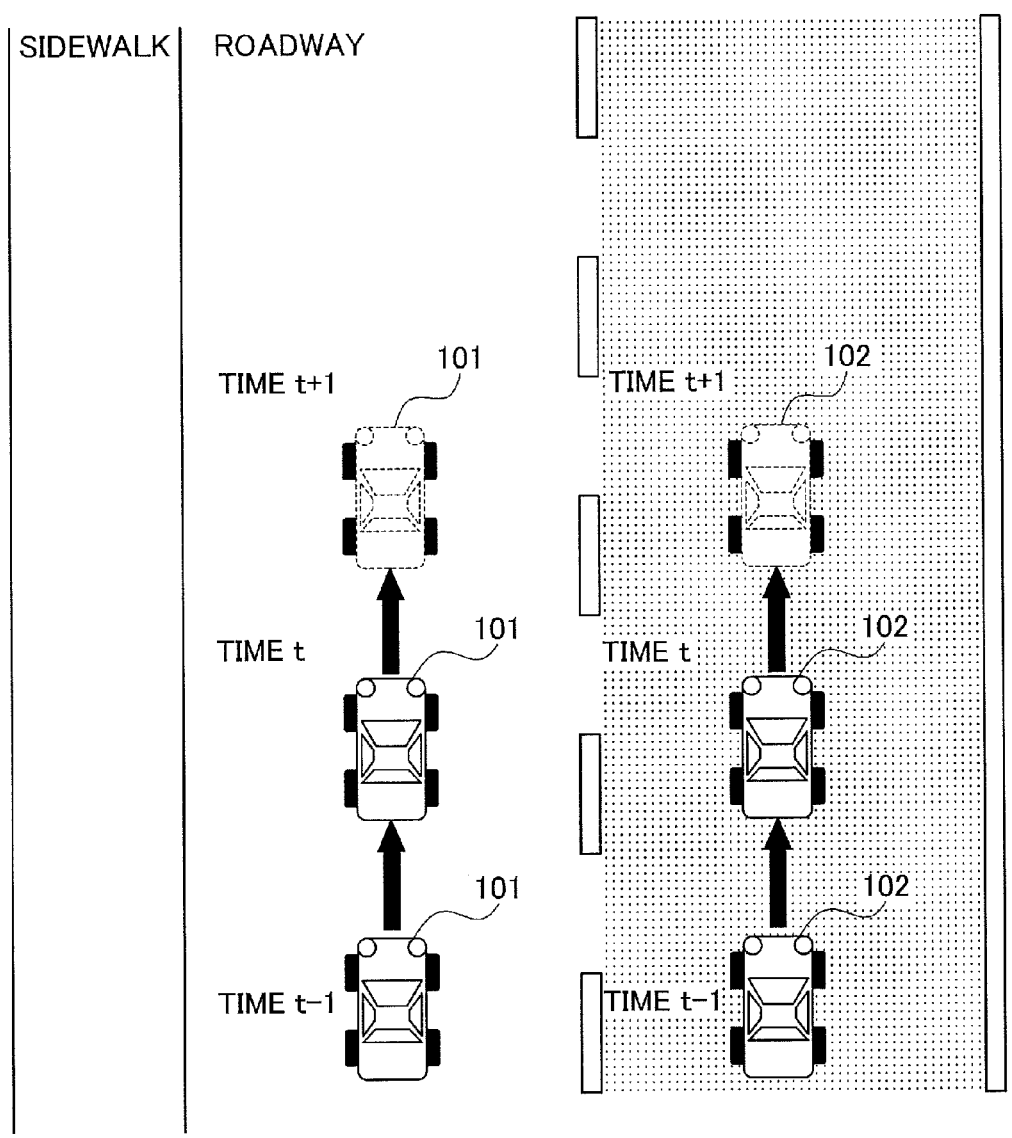
FIG. 14 illustrates an example in which two vehicles are traveling on lanes having different road surface conditions.
Figure 15:
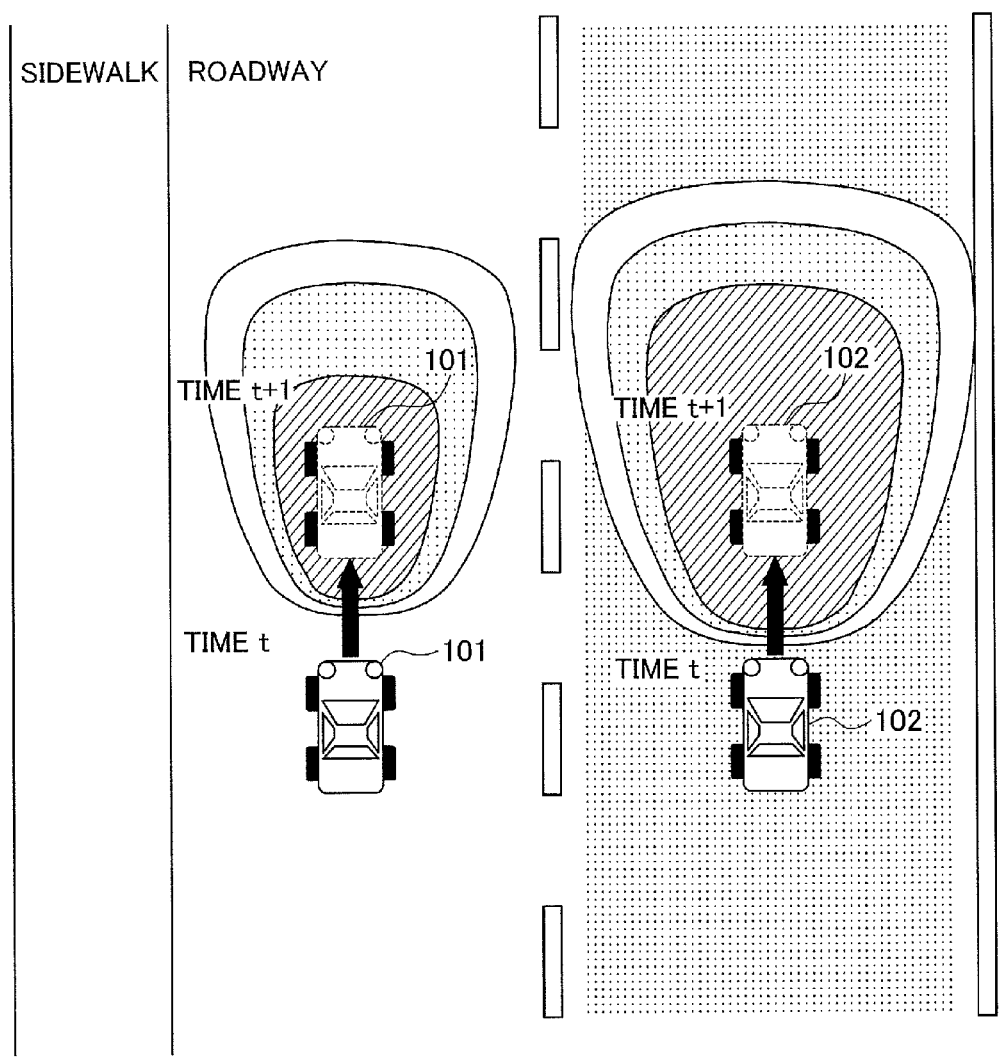
FIG. 15 is an example of risk maps when the two vehicles are traveling on the lanes having the different road surface conditions.

Next, an example of calculation of a risk map by the vehicle body control device according to the third embodiment will be described with reference to FIGS. 13 to 15. FIG. 13 is an operational flowchart of the risk range determiner 16 according to the third embodiment. FIG. 14 illustrates an example in which two vehicles are traveling on lanes having different road surface conditions. FIG. 15 is an example of generation of risk maps when the two vehicles are traveling on the lanes having the different road surface conditions. In the description of FIG. 13, operations that are the same as those in FIG. 4 will be given the same numerals and descriptions thereof will be omitted.

As illustrated in FIG. 14, when two vehicles 101 and 102 are traveling, the sensing means 11 senses the road surface conditions and outputs the obtained information to the road surface condition determiner 23. At this time, the information obtained by sensing by the sensing means 11 is, for example, image data of the road surfaces. In FIG. 14, the lane on which the vehicle 101 is traveling is dry and the lane on which the vehicle 102 is traveling is frozen.

In S3a, the road surface condition determiner 23 determines the road surface conditions on the basis of the information obtained from the sensing means 11. In this example, the road surface condition determiner 23 determines that the road surface condition of the lane on which the vehicle 101 is traveling is "dry" and the road surface condition of the lane on which the vehicle 102 is traveling is "frozen."

In S4a, the risk range determiner 16 obtains information on the road surface conditions from the road surface condition determiner 23, and generates risk maps depending on the road surface conditions. As illustrated in FIG. 15, when a road surface condition is frozen, the risk range determiner 16 generates a risk map having a larger range than when a road surface condition is dry. That is, the degree of risk of the risk map is set to be high. In this manner, the degree of risk of a risk map is changed depending on a road surface condition, which makes it possible to generate a risk map further taking into account the risk of collision.

In this embodiment, the adjustment of the range of a risk map depending on the road surface condition is performed by the risk range determiner 16, but it may be performed by the movement information obtaining unit 12. For example, the movement prediction unit 14 may obtain road surface information from the road surface condition determiner 23, and increase or decrease the movement prediction vector in the traveling direction and the movement prediction vectors in the left and right directions at a predetermined magnification ratio corresponding to the road surface information.

As above, the vehicle body control device according to the third embodiment detects the condition of the road on which an obstacle is moving and applies it to the size of the risk map, and thus can prevent reduction in reliability of the risk map due to worsening of the road surface. This makes it possible to further reduce unnecessary actions, such as an action of largely avoiding an obstacle to the own vehicle or sudden braking.

Fourth Embodiment

A vehicle body control device according to a fourth embodiment will be described below. The vehicle body control device according to the fourth embodiment is characterized in that it changes a range of a risk map on the basis of the state of an obstacle.

Figure 16:
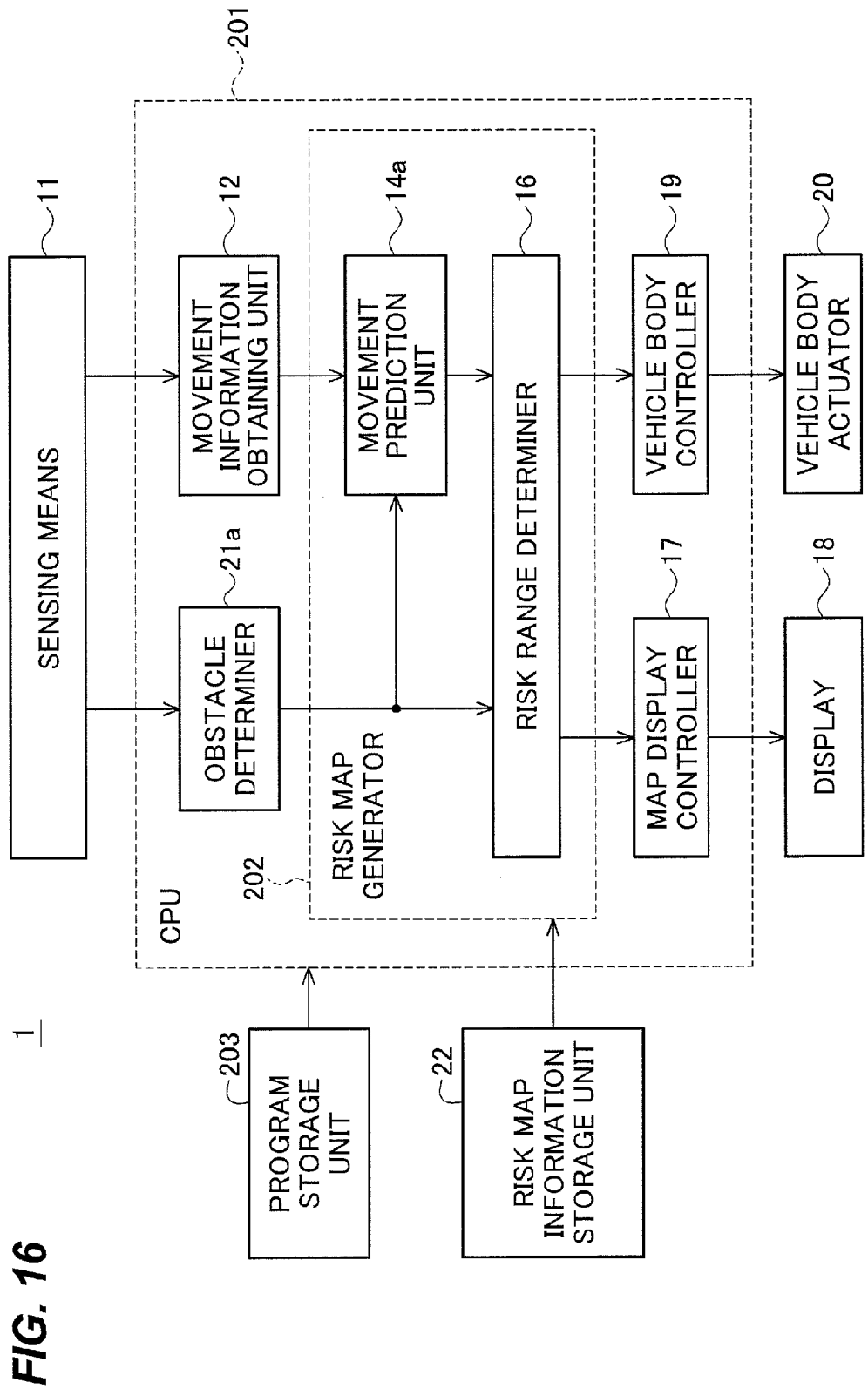
FIG. 16 is a configuration diagram of a vehicle body control device according to a fourth embodiment.

A configuration of the vehicle body control device according to the fourth embodiment will be described below with reference to FIG. 16. FIG. 16 is a configuration diagram of the vehicle body control device according to the fourth embodiment. In this embodiment, the sensing means 11 includes a means, such as a camera, capable of imaging an obstacle. In the description of FIG. 16, elements that are the same as those illustrated in FIGS. 1, 10, and 12 will be given the same reference numerals and descriptions thereof will be omitted.

The obstacle determiner 21a obtains image data of an obstacle from the sensing means 11, such as a camera. The obstacle determiner 21a also determines the type of the obstacle by pattern matching that compares the obtained image data with patterns of obstacles stored in advance. Further, when the determined obstacle is a motorcycle or a bicycle, the obstacle determiner 21a determines tilt of it. In the determination of the tilt, as in the determination of the type of the obstacle, pattern matching or other methods may be used. The obstacle determiner 21a outputs, to the risk range determiner 16, information on the determined type of the obstacle and information (obstacle state information) on the tilt of the obstacle. For example, the information on the tilt of the obstacle may include a value, such as 5°, 10°, or 15°, with a vertical state relative to the ground as 0°, or may include information indicating only whether the obstacle is tilted or not. In the following description, bicycles, motorcycles, and the like will be collectively referred to as two-wheelers.

On the basis of the speed and direction calculated by the movement information obtaining unit 12, a movement prediction unit 14a predicts movement of an obstacle to calculate a movement prediction vector. Also, the movement prediction unit 14a obtains the speed of the obstacle and information on the state of the obstacle from the obstacle determiner 21a, and calculates movement prediction vectors in the left and right directions with respect to the traveling direction of the obstacle. In the calculation of the movement prediction vectors by the movement prediction unit 14a, while the movement prediction vector in the traveling direction is calculated as in the movement prediction unit 14 illustrated in FIG. 1, the movement prediction vectors in the left and right directions with respect to the traveling direction of the obstacle are adjusted depending on the state of the obstacle. In adjusting the movement prediction vectors in the left and right directions, the movement prediction unit 14a makes the movement prediction vector in the direction in which the two-wheeler is tilted longer than the other movement prediction vector. For example, when the obstacle is a motorcycle tilted to the left with respect to the traveling direction, the movement prediction vector in the right direction with respect to the traveling direction is decreased by 80%. Such operation of the movement prediction unit 14a makes it possible to predict the traveling direction of a two-wheeler from the tilt of the two-wheeler and reflect it in the risk map.

Figure 17:
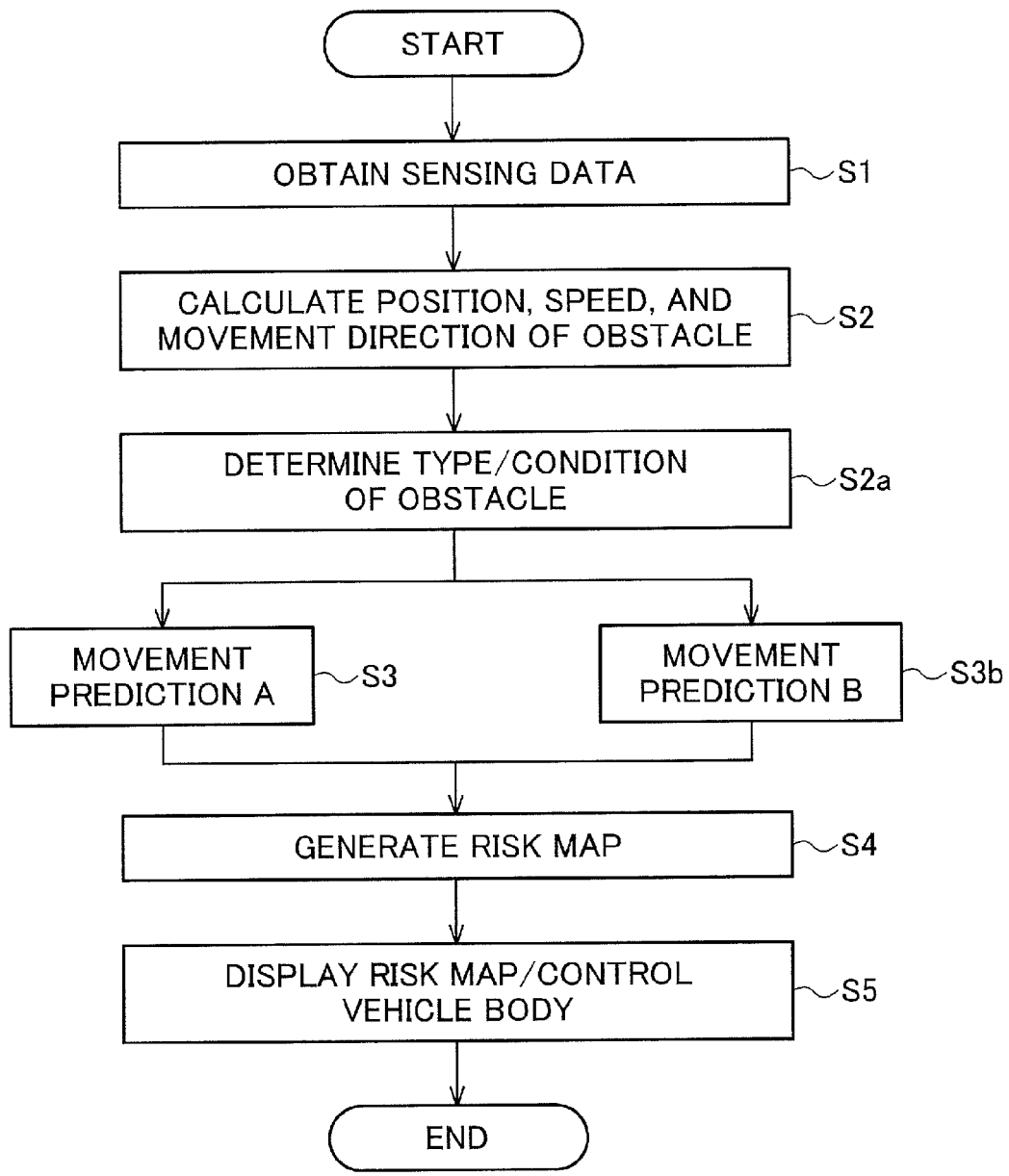
FIG. 17 is an operational flowchart of the vehicle body control device according to the fourth embodiment.

An operation of the vehicle body control device according to the fourth embodiment will be described below with reference to FIG. 17. FIG. 17 is an operational flowchart of the vehicle body control device according to the fourth embodiment. In the description of FIG. 17, operations that are the same as those in FIG. 4 will be given the same signs and descriptions thereof will be omitted.

Figure 18:
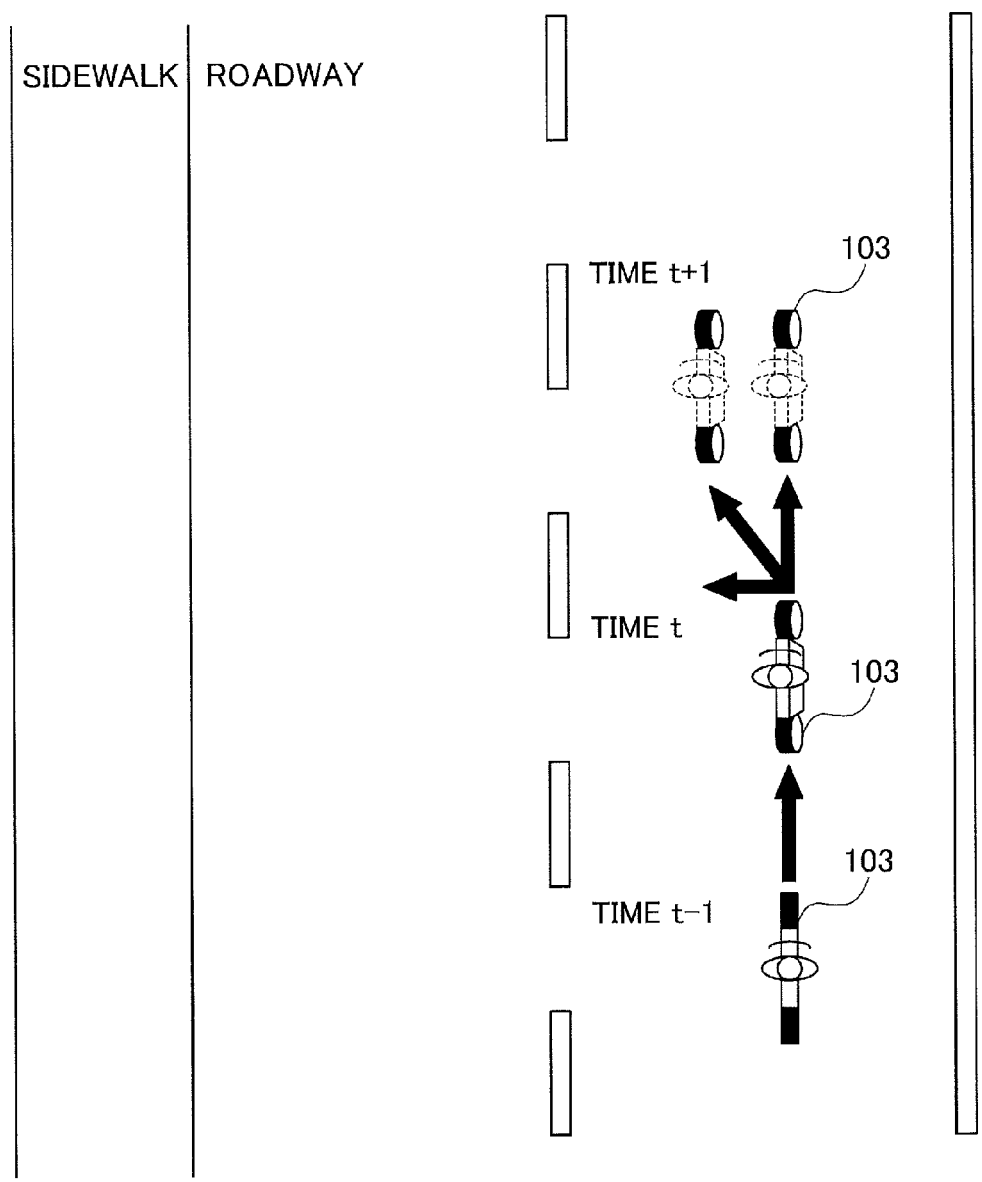
FIG. 18 is a diagram for explaining the tilt of an obstacle.

In S2a, the vehicle body control device 1 according to the fourth embodiment determines the type and state of an obstacle. FIG. 18 is a diagram for explaining tilt of an obstacle. In FIG. 18, the motorcycle is tilted at the current time t. The tilt of the motorcycle is, for example, 10°. The obstacle determiner 21a determines, using the sensor information obtained from the sensing means 11, whether the obstacle is an obstacle, such as a motorcycle, whose tilt can be determined or another obstacle. As a result of the determination, when the obstacle determiner 21a determines that the obstacle is an obstacle whose tilt can be determined, it calculates the tilt. In this example, the motorcycle 103 is tilted by 10°, so the obstacle determiner 21a outputs information on the determined tilt of 10° as obstacle state information to the movement prediction unit 14a.

When the obstacle determiner 21a determines in S2a that the obstacle is not an obstacle whose tilt can be determined, e.g., when the obstacle is a vehicle, the operation proceeds to S3. On the other hand, when the obstacle determiner 21a determines in S2a that the obstacle is an obstacle, such as a motorcycle, whose tilt can be determined, the operation proceeds to S3b. In the example of FIG. 18, the obstacle is the motorcycle 103, so the operation proceeds to S3b.

In S3b, the movement prediction unit 14a calculates the movement prediction vectors on the basis of the obtained obstacle state information. At this time, since the motorcycle 103 is tilted by 10° to the left with respect to the traveling direction, the movement prediction vector in the left direction with respect to the traveling direction is adjusted to be longer than the movement prediction vector in the right direction at a ratio corresponding to the left tilt of 10°. In this case, it is necessary to previously determine, by experiment or the like, how long the movement prediction vector in the left direction is made. In this example, the movement prediction vector in the right direction is 0.

Figure 19:
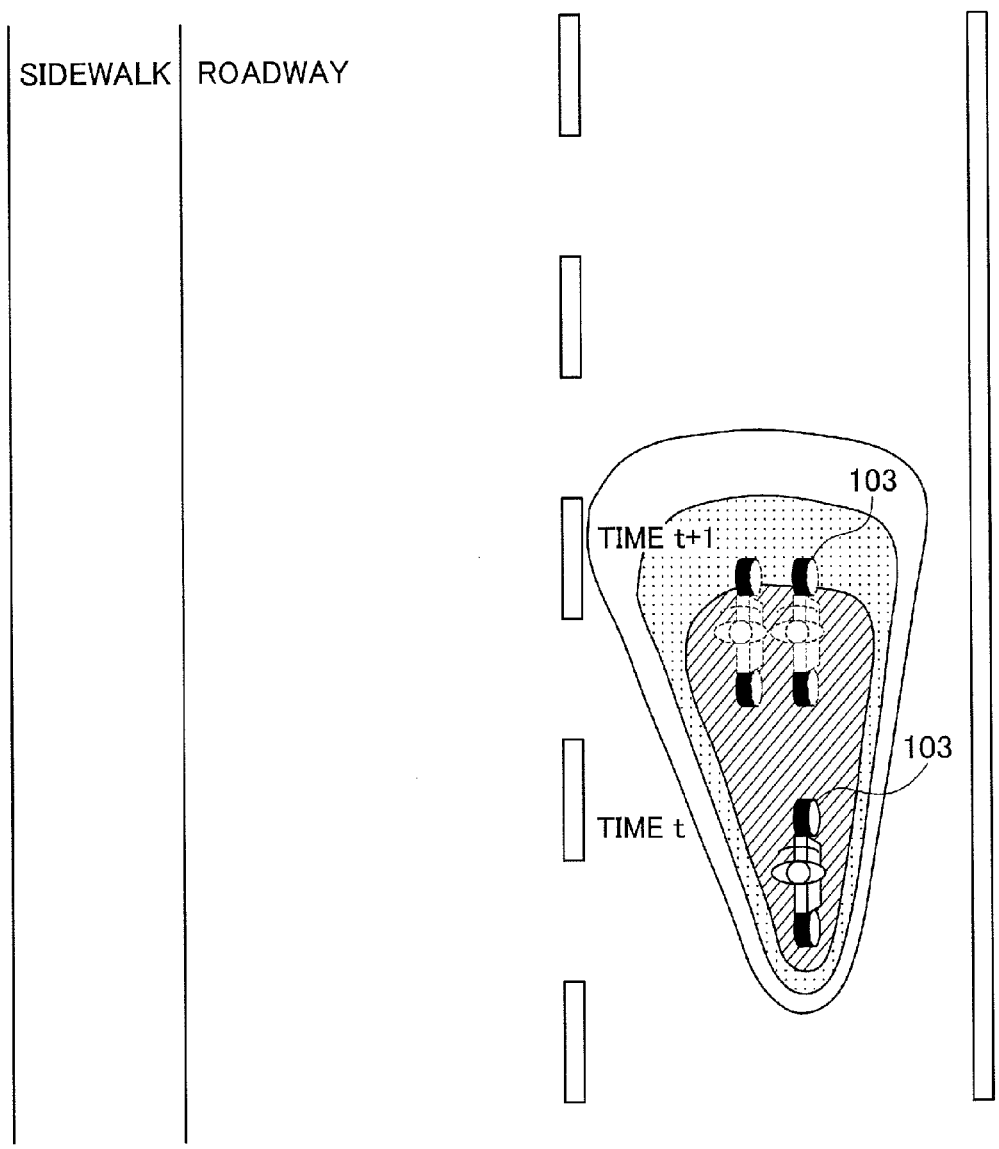
FIG. 19 is an example of a risk map generated by a risk map generator according to the fourth embodiment.

In S4, the risk range determiner 16 generates a risk map on the basis of the movement prediction vectors calculated by the movement prediction unit 14a. FIG. 19 is an example of the risk map generated by the risk range determiner 16 according to the fourth embodiment. In FIG. 19, the risk map is widened to the left with respect to the traveling direction of the motorcycle 103. This indicates that, since the motorcycle 103 is tilted to the left at the current time t, it is likely to travel to the left at the time t+1.

In this embodiment, the change of the range of the risk map based on the tilt of an obstacle is performed by the movement prediction unit 14a, but it may be performed by the risk range determiner 16. In this case, the risk map information storage unit 22 previously stores preset data in which the tilt of an obstacle and an adjustment ratio for the range of the risk map are associated with each other. On the basis of information on the tilt of an obstacle obtained from the obstacle determiner 21a, the risk range determiner 16 adjusts the range of the risk map at the corresponding adjustment ratio for the range of the risk map.

As above, the vehicle body control device 1 according to the fourth embodiment changes the range of the risk map on the basis of the state of an obstacle, which makes it possible to calculate a risk map having higher accuracy for an obstacle, such as a bicycle or a motorcycle, whose traveling direction can be predicted from the tilt. This can reduce unnecessary actions, such as an action of largely avoiding an obstacle to the own vehicle or sudden braking.

Fifth Embodiment

A vehicle body control device according to a fifth embodiment will be described. The vehicle body control device according to the fifth embodiment is characterized in that it takes into account the possibility of a right or left turn of an obstacle, and changes the range of the risk map on the basis of map data.

Figure 20:
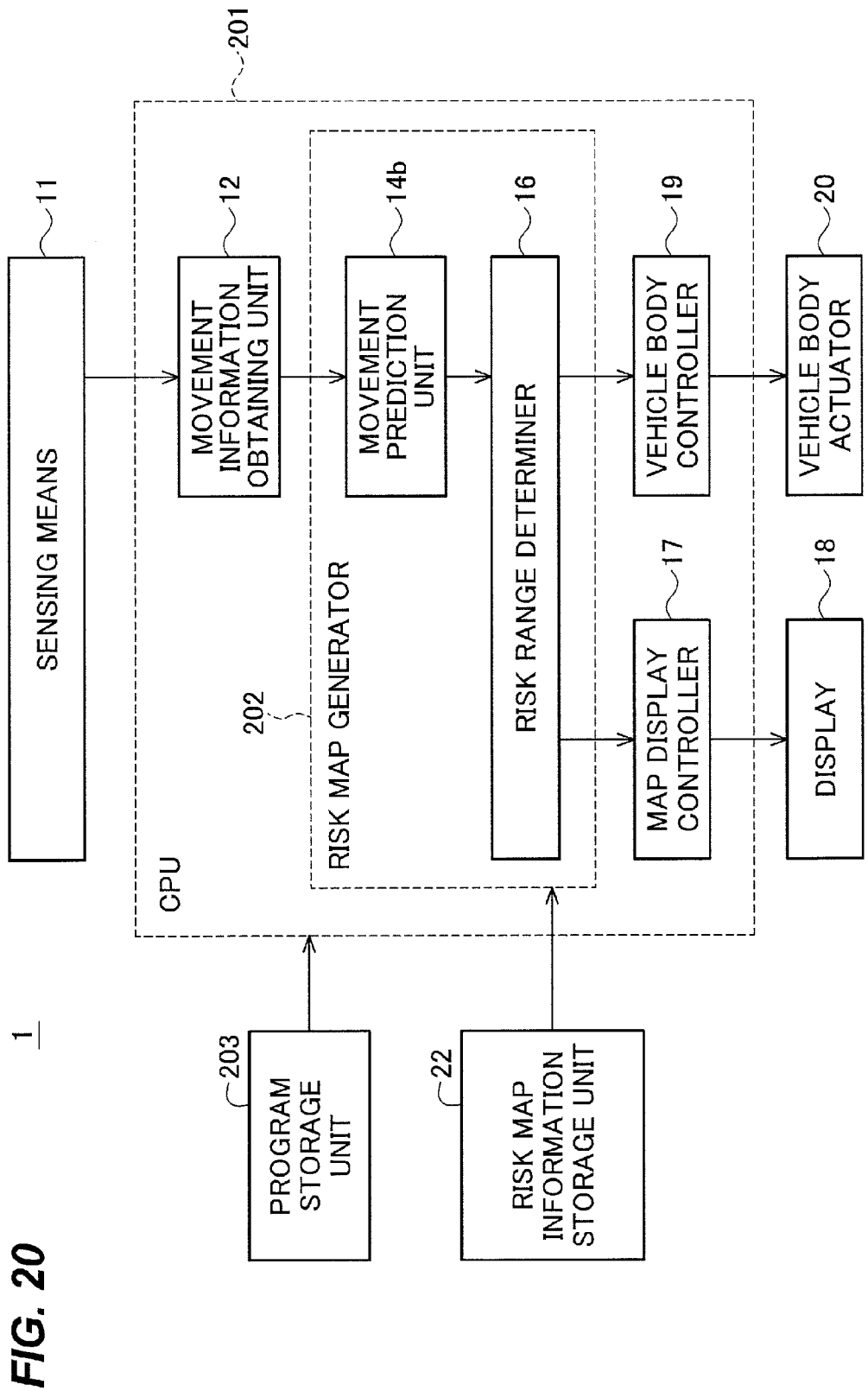
FIG. 20 is a configuration diagram of a vehicle body control device according to a fifth embodiment.

A configuration of the vehicle body control device according to the fifth embodiment will be described below with reference to FIG. 20. FIG. 20 is a configuration diagram of the vehicle body control device according to the fifth embodiment. In the description of FIG. 20, elements that are the same as those illustrated in FIGS. 1, 10, 12, and 16 will be given the same reference numerals and descriptions thereof will be omitted.

The vehicle body control device 1 according to this embodiment stores map data in the risk map information storage unit 22.

The map data is data regarding a road map and includes, for example, information on one-way traffic or freeway exits or other information.

The movement prediction unit 14b obtains the map data from the risk map information storage unit 22 and calculates movement prediction vectors on the basis of the map data.

Figure 21:
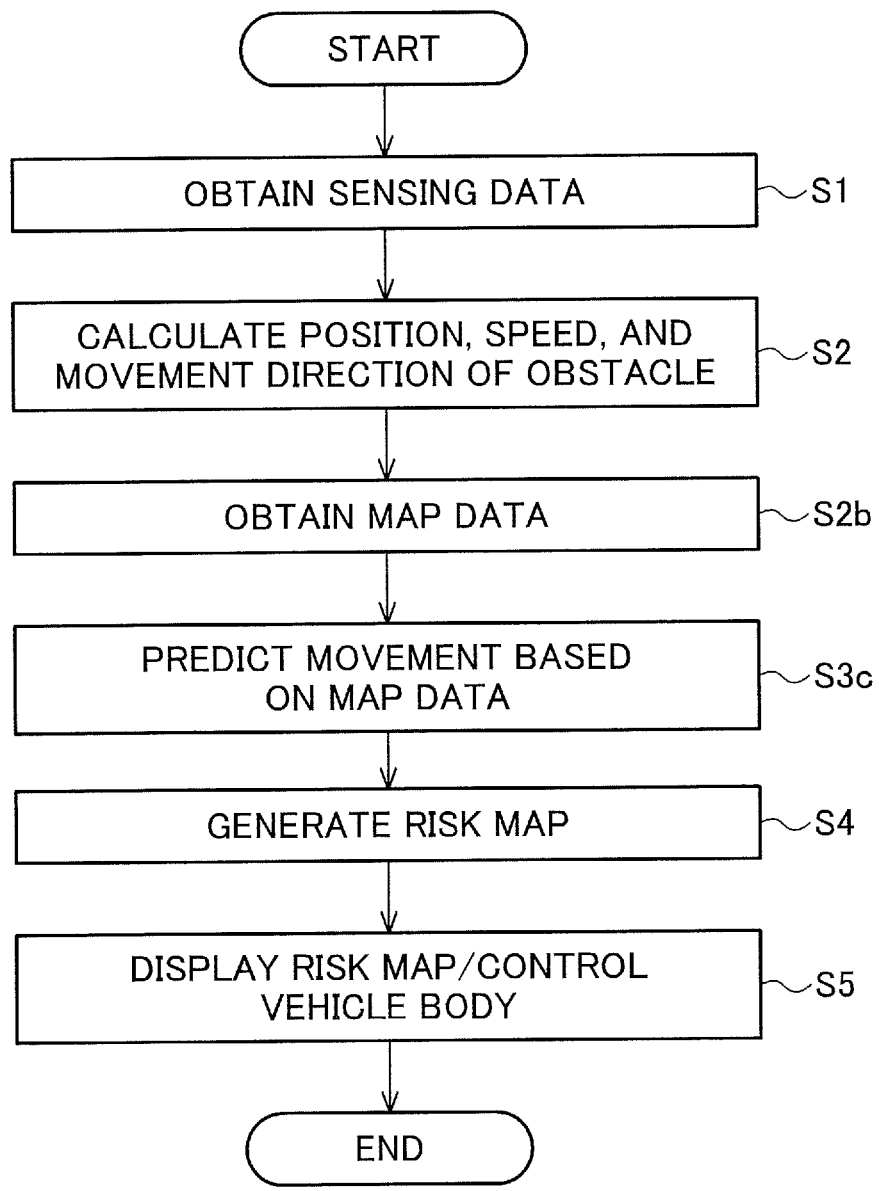
FIG. 21 is an operational flowchart of the vehicle body control device according to the fifth embodiment.
Figure 22:
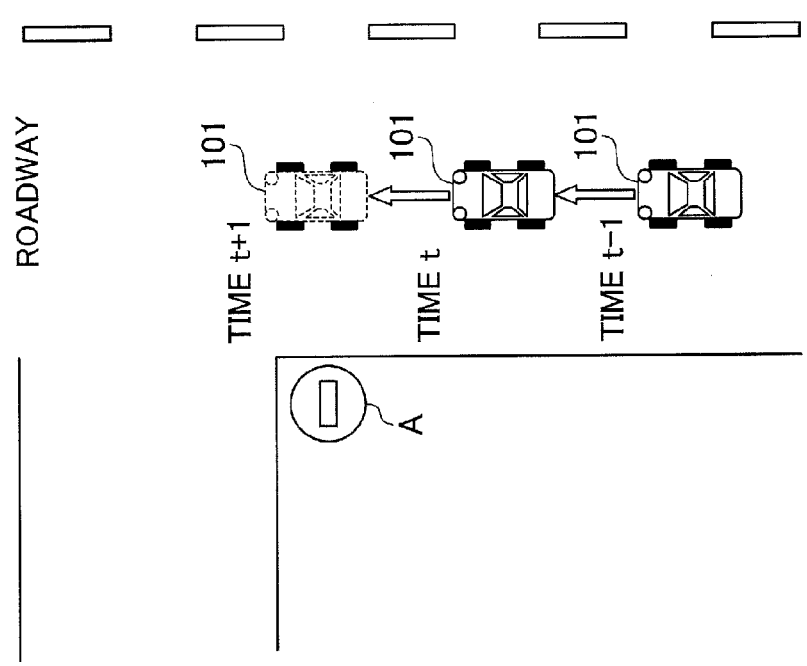
FIG. 22 is an example of a vehicle traveling on a road on which a no-entry sign is placed on the left hand.

Next, an operation of the vehicle body control device according to the fifth embodiment will be described with reference to FIGS. 21 and 22. FIG. 21 is an operational flowchart of the vehicle body control device according to the fifth embodiment. FIG. 22 is an example of a vehicle traveling on a road on which a no-entry sign is placed on the left hand. In the following description, operations that are the same as those illustrated in FIG. 4 will be given the same signs and descriptions thereof will be omitted.

In S2b, the movement prediction unit 14b obtains map data from the risk map information storage unit 22. When obtaining the map data, it obtains map data around the current location on the basis of positional information from a current position acquisition means (not illustrated), such as a global positioning system (GPS).

In S3c, the movement prediction unit 14b calculates movement prediction vectors on the basis of the obtained map data. For example, in FIG. 22, there is the no-entry sign on the left hand of a vehicle 101 traveling on a lane. Data of road signs, such as no-entry signs, is included in the map data. Normally, since a vehicle cannot enter a road on which a no-entry sign is placed as indicated by A in FIG. 22, the vehicle 101 is significantly less likely to turn left. Thus, when the movement prediction unit 14b calculates the movement prediction vectors in the left and right directions with respect to the traveling direction, it makes the movement prediction vector in the left direction smaller than the movement prediction vector in the right direction. The movement prediction vectors in the left and right directions are previously determined from results of experiments or the like.

Figure 23:
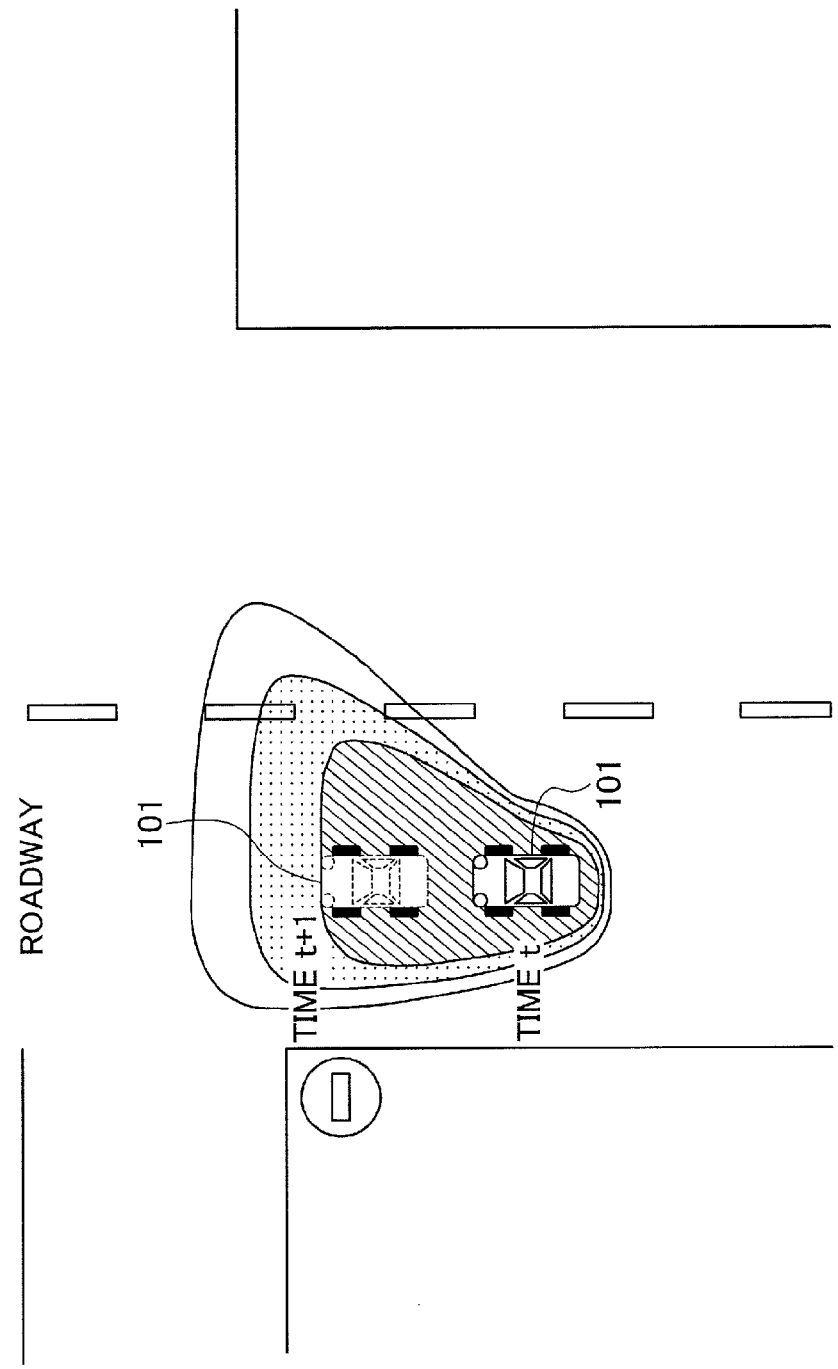
FIG. 23 is an example of a risk map generated by a risk map generator according to the fifth embodiment.

In S4, the risk range determiner 16 generates the risk map on the basis of the movement prediction vectors calculated by the movement prediction unit 14b. FIG. 23 is an example of the risk map generated by the risk range determiner 16 according to the fifth embodiment. As described with reference to FIG. 22, since the vehicle 101 is less likely to turn left, the risk map is wide on the right side. Such a configuration prevents, using the map data, the risk map from being widened in a direction toward a road that the vehicle is less likely to enter, and thus can reduce unnecessary circumvention or sudden braking of the own vehicle.

Figure 24:
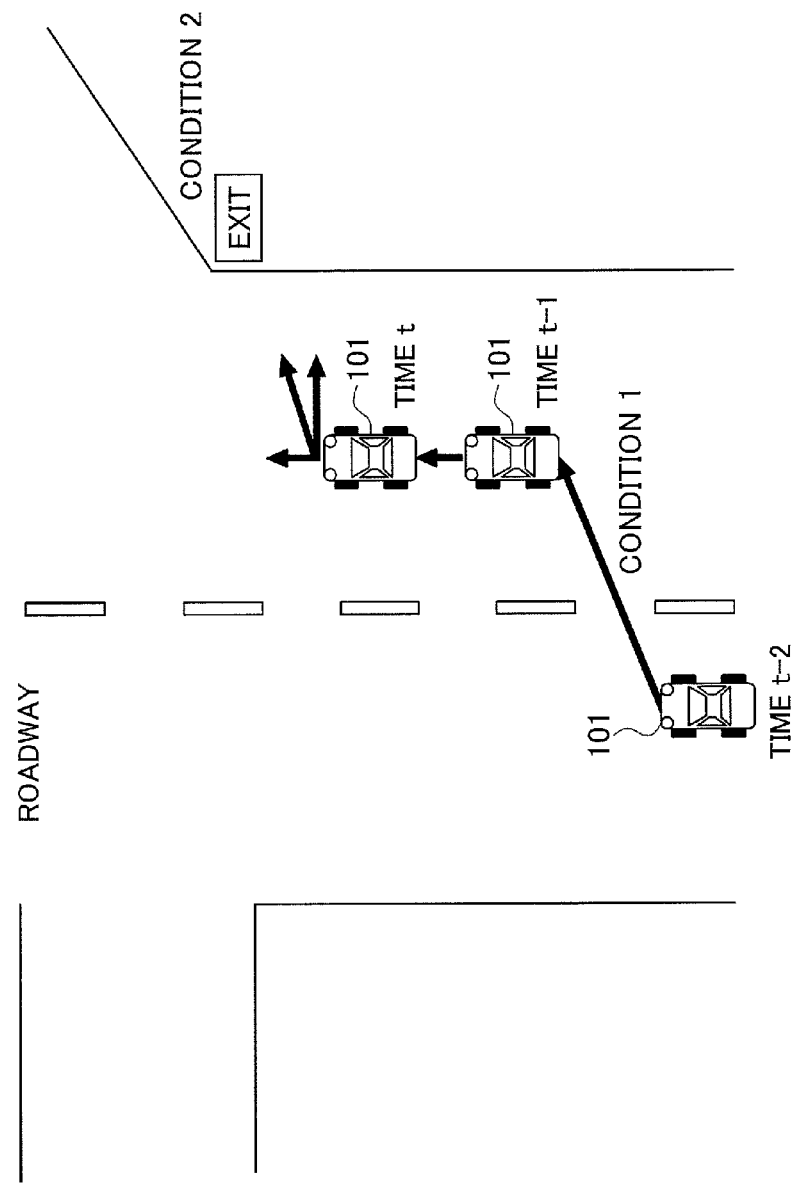
FIG. 24 is an example in which a movement prediction unit 14b according to the fifth embodiment calculates movement prediction vectors on the basis of map data and information on previous movement of an obstacle.
Figure 25:
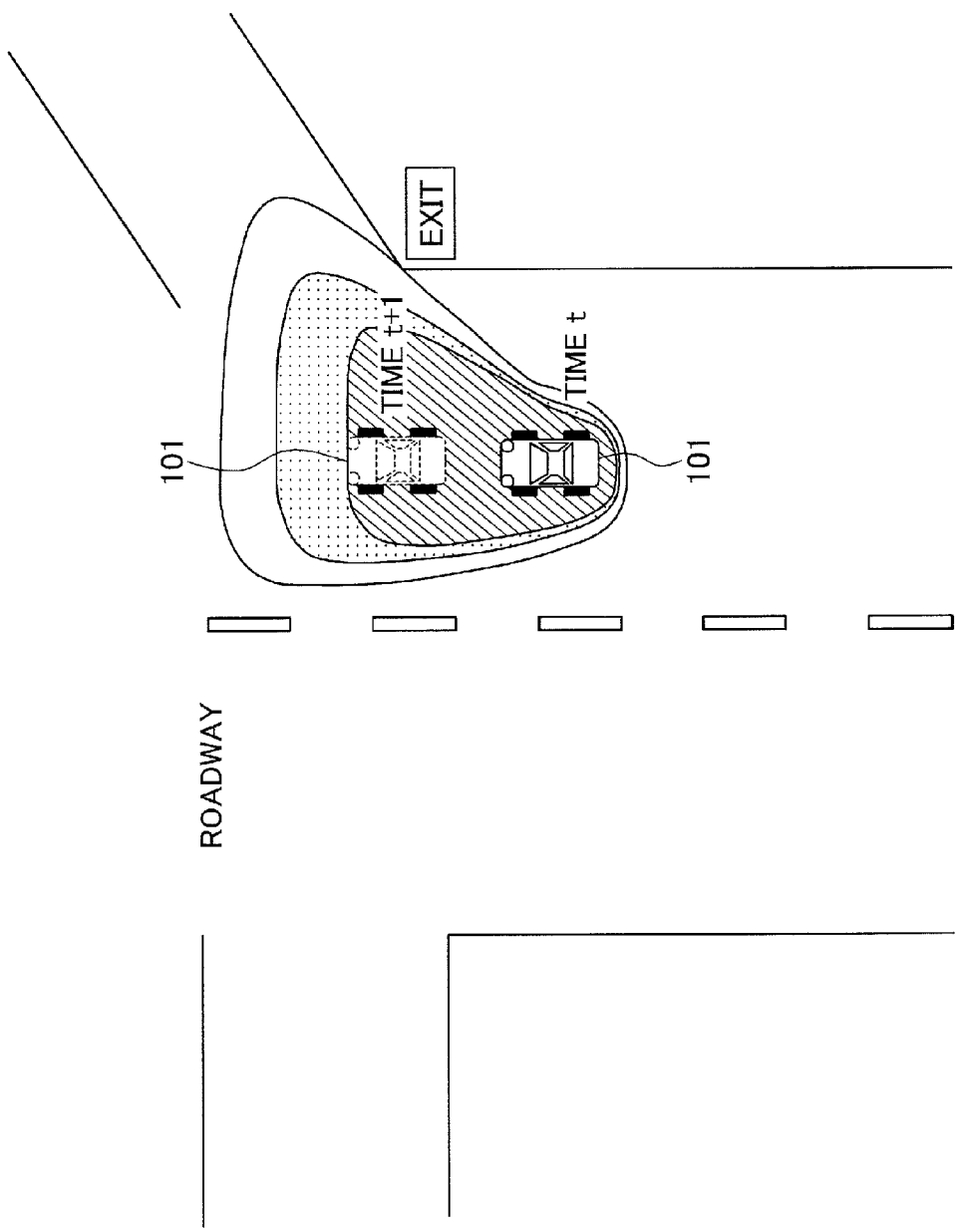
FIG. 25 is an example in which the risk range determiner according to the fifth embodiment generates a risk map on the basis of the map data and the information on previous movement of the obstacle.

Although the movement prediction unit 14b according to the fifth embodiment has been described to determine movement prediction vectors on the basis of the map data, it is not limited to this and may determine the movement prediction vectors on the basis of the map data and information on previous movement of an obstacle. FIG. 24 is an example in which the movement prediction unit 14b according to the fifth embodiment calculates the movement prediction vectors on the basis of the map data and information on previous movement of an obstacle. For example, suppose that a vehicle makes a lane change to a right-hand lane on a freeway at a time t−2. This will be referred to as condition 1. In this case, suppose that the vehicle 101 goes straight on the lane after the change at a time t−1, and map data indicating that there is a freeway exit on the right hand of the vehicle 101 is obtained at a time t. This will be referred to as condition 2. When conditions 1 and 2 are satisfied, the movement prediction unit 14b sets the movement prediction vector in the direction toward the exit to be large. FIG. 25 is an example in which the risk range determiner 16 according to the fifth embodiment generates a risk map on the basis of the map data and information on previous movement of the obstacle. As illustrated in FIG. 25, the risk range determiner 16 generates a risk map widened to the right with respect to the traveling direction of the vehicle 101. With such a configuration, it is possible to generate a risk map having higher accuracy.

In the fifth embodiment, the adjustment of the range of the risk map based on the map data is performed by the movement prediction unit 14b. However, this is not mandatory, and the adjustment of the range of the risk map may be performed by the risk range determiner 16. In this case, the risk range determiner 16 obtains the map data and adjusts the range of the risk map.

As above, the vehicle body control device according to the fifth embodiment applies the content of the map data to a risk map, which makes it possible to generate a risk map having higher accuracy when movement of an obstacle can be predicted from the map data, such as prohibition of entry. This can further reduce unnecessary actions, such as an action of largely avoiding an obstacle to the own vehicle or sudden braking.

The vehicle body control devices according to the first to fifth embodiments can be implemented in combination.

The information stored in the risk map information storage unit 22 according to the first to fifth embodiments need not necessarily be stored in the risk map information storage unit 22 in the vehicle body control device 1. For example, the information may be received as necessary from a storage means outside the vehicle body control device 1.

REFERENCE SIGNS LIST

1 vehicle body control device, 11 sensing means, 12 movement information obtaining unit, 14 movement prediction unit, 16 risk range determiner, 17 map display controller, 18 display, 19 vehicle body controller, 20 vehicle body actuator, 21 obstacle determiner, 22 risk map information storage unit, 23 road surface condition determiner, 201 CPU, 202 risk map generator, 203 program storage unit.

The invention claimed is:
1. A collision risk calculation device for a vehicle, comprising:
  a processor configure to
    obtain a position, a speed, and a movement direction of an obstacle at a current time; and
    generate a risk map indicating a range within which the obstacle can exist one unit of time after the current time and degree of risk of collision of the vehicle with the obstacle within the range, on a basis of the position, speed, and movement direction of the obstacle at the current time,
  wherein the processor adjusts the range so that the range is smaller in left and right directions with respect to the movement direction of the obstacle as the speed of the obstacle in the movement direction is higher,
  wherein the processor generates the risk map by
    calculating a traveling movement prediction vector in the movement direction of the obstacle on a basis of the speed and movement direction of the obstacle, calculating a left movement prediction vector in the let direction with respect to the movement direction of the obstacle on a basis of the speed and movement direction of the obstacle, calculating a right movement prediction vector in the right direction with respect to the movement direction of the obstacle on a basis of the speed and movement direction of the obstacle, calculating a left resultant vector of the traveling movement prediction vector and the left movement prediction vector, calculating a right resultant vector of the traveling movement prediction vector and the right movement prediction vector, and determining the range so that the range includes the traveling movement prediction vector and the left and right resultant vectors, and wherein the processor calculates the left and right movement prediction vectors so that the left and right movement prediction vectors are shorter as the speed of the obstacle is higher.

2. The collision risk calculation device of claim 1, wherein the processor makes the range small in the left and right directions with respect to the traveling direction of the obstacle when the speed of the obstacle is higher than a predefined threshold, and makes the range large in the left and right directions with respect to the traveling direction of the obstacle when the speed of the obstacle is lower than the threshold.

3. The collision risk calculation device of claim 1, further comprising a road surface information detector that detects a condition of a road surface, wherein the processor changes a size of the range on a basis of the detected condition of the road surface.

4. The collision risk calculation device of claim 1, further comprising an obstacle determiner that determines a type of the obstacle and tilt of the obstacle, wherein when the obstacle determiner determines that the obstacle is a two-wheeler and the two-wheeler is tilted, the processor makes the range large in a direction in which the two-wheeler is tilted.

5. The collision risk calculation device of claim 1, further comprising a memory that stores map data including information regarding a road map, wherein the processor changes a size of the range in the left and right directions with respect to the movement direction of the obstacle, on a basis of the map data.

6. The collision risk calculation device of claim 1, wherein the processor receives signals from a sensor at a predefined time interval, obtains the position, speed, and movement direction of the obstacle on a basis of the received sensor signals, and generates the risk map with the predefined time interval as the unit of time.

7. A collision risk display device comprising:

a display; and a map, display controller that obtains the risk map from the collision risk calculation device of claim 1 and controls the display to display the obtained risk map.

8. A vehicle body control device for a vehicle comprising:

a vehicle body actuator that controls motion of the vehicle; and a vehicle body controller that obtains the risk map from the collision risk calculation device of claim 1 and controls the vehicle body actuator on a basis of the obtained risk map.

* * * * *